United States Patent
Hao et al.

(10) Patent No.: US 11,991,570 B2
(45) Date of Patent: May 21, 2024

(54) SIGNAL TRANSMISSION METHOD AND DEVICE, AND COMPUTER STORAGE MEDIUM

(71) Applicant: ZTE Corporation, Guangdong (CN)

(72) Inventors: Peng Hao, Guangdong (CN); Junfeng Zhang, Guangdong (CN); Xing Liu, Guangdong (CN); Zhaohua Lu, Guangdong (CN); Xinhui Wang, Guangdong (CN); Liujun Hu, Guangdong (CN); Gang Bai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/321,536

(22) Filed: May 22, 2023

(65) Prior Publication Data

US 2023/0328602 A1 Oct. 12, 2023

Related U.S. Application Data

(63) Continuation of application No. 17/536,626, filed on Nov. 29, 2021, now Pat. No. 11,659,456, which is a (Continued)

(30) Foreign Application Priority Data

Aug. 4, 2016 (CN) .......................... 201610629969.4
Sep. 19, 2016 (CN) .......................... 201610831736.2

(51) Int. Cl.
*H04W 36/00* (2009.01)
*H04J 11/00* (2006.01)
(Continued)

(52) U.S. Cl.
CPC ..... *H04W 36/0072* (2013.01); *H04J 11/0093* (2013.01); *H04W 16/28* (2013.01);
(Continued)

(58) Field of Classification Search
CPC ......... H04W 36/0072; H04W 72/0453; H04W 72/0446; H04W 36/30; H04W 16/28;
(Continued)

(56) References Cited

U.S. PATENT DOCUMENTS 11,190,991 B2   11/2021   Hao et al.
2010/0238824 A1   9/2010   Farajidana et al.
(Continued)

FOREIGN PATENT DOCUMENTS

CN   1703847 A    11/2005
CN   105284059 A   1/2016
(Continued)

OTHER PUBLICATIONS

3GPP, Huawei, HiSilicon, "Beam Based Access for 5G M-MIMO," TSG RAN WG1 Meeting #84bis, Busan, Korea, R1-162166, 6 pages, Apr. 2016.
(Continued)

*Primary Examiner* — Abdullahi Ahmed
(74) *Attorney, Agent, or Firm* — Perkins Coie LLP

(57) ABSTRACT

Disclosed are a signal transmission method and device, and a computer storage, including that: a base station sends or receives a signal within a sweep time interval, an access signal time interval, which is comprised of sweep time blocks sweep time blocks. The access signal time interval includes a downlink access signal time interval and an uplink access signal time interval. The base station sends the signal over the downlink access signal time interval, and receives the signal over the uplink access signal time interval. A terminal sends or receives a signal within the access signal time interval which is comprised of the sweep time blocks. The terminal sends the signal over the uplink access signal time interval, or receives the signal over the downlink access signal time interval.

20 Claims, 9 Drawing Sheets

NR system

Multi-beam sweep transmission

Related U.S. Application Data continuation of application No. 16/267,212, filed on Feb. 4, 2019, now Pat. No. 11,190,991, which is a continuation of application No. PCT/CN2017/082063, filed on Apr. 26, 2017.

(51) Int. Cl.
  *H04W 16/28* (2009.01)
  *H04W 36/30* (2009.01)
  *H04W 72/0446* (2023.01)
  *H04W 72/0453* (2023.01)

(52) U.S. Cl.
  CPC ....... *H04W 36/30* (2013.01); *H04W 72/0446* (2013.01); *H04W 72/0453* (2013.01); *H04J 2011/0016* (2013.01); *H04J 2011/0096* (2013.01)

(58) Field of Classification Search
  CPC ............... H04W 74/08; H04J 11/0093; H04J 2011/0096; H04J 2011/0016; H04J 3/16
  See application file for complete search history.

(56) References Cited

U.S. PATENT DOCUMENTS

| | | | |
|---|---|---|---|
| 2012/0327895 A1* | 12/2012 | Wallen | H04W 48/12 370/329 |
| 2014/0254515 A1 | 9/2014 | Kim et al. | |
| 2015/0365147 A1 | 12/2015 | Ketchum et al. | |
| 2016/0142898 A1 | 5/2016 | Poitau et al. | |
| 2017/0201980 A1 | 7/2017 | Hakola et al. | |
| 2017/0311276 A1* | 10/2017 | Tsai | H04B 7/0695 |
| 2019/0089420 A1* | 3/2019 | Koskela | H04B 7/088 |
| 2019/0159148 A1* | 5/2019 | Jung | H04W 56/006 |
| 2019/0173638 A1* | 6/2019 | Wang | H04L 5/0094 |
| 2019/0181935 A1* | 6/2019 | Karjalainen | H04B 7/0617 |
| 2019/0239123 A1* | 8/2019 | Kim | H04W 80/08 |
| 2019/0306888 A1* | 10/2019 | Takeda | H04W 74/0833 |
| 2019/0342805 A1 | 11/2019 | Hao et al. | |

FOREIGN PATENT DOCUMENTS

| | | |
|---|---|---|
| CN | 105723639 A | 6/2016 |
| JP | 2012-205176 A | 10/2012 |

OTHER PUBLICATIONS

3GPP, Nokia, Alcatel-Lucent Shanghai Bell, "Support for Beam Based Common Control Plane," TSG-RAN WG1#85, Nanjing, P.R. China, R1-165364, 5 pages, May 2016.
3GPP, Nokia, Alcatel-Lucent Shanghai Bell, "Support for Beam Based Common Control Plane in 5G New Radio," TSG-RAN WG1 #84bis, Busan, Korea, R1-162895, 4 pages, Apr. 2016.
3GPP, Samsung, "Framework for Beamformed Access," TSG RAN WG1 #85, Nanjing, China, R1-164013, 4 pages, May 2016.
3GPP, ZTE, "Design Considerations for DL Sweeping Time Interval in NR," TSG RAN WG1 Meeting #86, Gothenburg, Sweden, RI-166418, 4 pages, Aug. 2016.
3GPP, ZTE, "Overview of NR Initial Access," TSG RAN WG1 Meeting #86, Gothenburg, Sweden, RI-166417, 6 pages, Aug. 2016.
3GPP, ZTE, ZTE Microelectronics, "Considerations on Sweeping Time Interval in NR", TSG RAN WG1 #86b, Lisbon, Portugal, R1-1608966, 10 pages, Oct. 2016.
Chinese Office Action dated May 26, 2021 for Chinese Patent Application No. 202011197787.7, filed on Sep. 19, 2016 (7 pages).
Extended Search Report dated Feb. 6, 2020 for European Application No. 17836186.1, filed on Mar. 4, 2019 (6 pages).
International Search Report and Written Opinion dated Jul. 20, 2017 for International Application No. PCT/CN2017/082063, filed on Apr. 26, 2017 (17 pages).
Communication pursuant to Article 94(3) EPC dated Dec. 1, 2021 for European Patent Application No. 17836186.1, filed on Apr. 26, 2017 (6 pages).
Chinese Notification to Grant dated Jan. 10, 2022 for Chinese Patent Application No. 202011197787.7, filed on Sep. 19, 2016 (pages).
3GPP "Technical Specification Group Radio Access Network; Evolved Universal Terrestrial Radio Access (E-UTRA); Radio Resource Control (RRC); Protocol specification (Release 13)," TS 36.331 d20 revision, V13.2.0, 623 pages, Jun. 2016.
EPO, Intention to Grant for European Application No. 127836186.1, dated Jun. 5, 2023, 9 pages.
Extended Search Report mailed on Mar. 5, 2024 for European Application No. 23196530.2. (9 pages).

* cited by examiner

A base station sends or receives a signal within an STI, where the STI is consisted of STBs, the STI is a downlink STI or an uplink STI, and the base station sends the signal over the downlink STI, or receives the signal over the uplink STI

601

A terminal sends or receives a signal within an STI, where the STI is consisted of STBs, the STI is an uplink STI or a downlink STI, and the terminal sends the signal over the uplink STI, or receives the signal over the downlink STI — 701

SIGNAL TRANSMISSION METHOD AND DEVICE, AND COMPUTER STORAGE MEDIUM

CROSS-REFERENCE TO RELATED APPLICATIONS

This patent document is a continuation of U.S. application Ser. No. 17/536,626 entitled "SIGNAL TRANSMISSION METHOD AND DEVICE, AND COMPUTER STORAGE MEDIUM", filed on Nov. 29, 2021, which is a continuation of U.S. application Ser. No. 16/267,212 entitled "SIGNAL TRANSMISSION METHOD AND DEVICE, AND COMPUTER STORAGE MEDIUM", filed on Feb. 4, 2019, which is a continuation of and claims priority to International Patent Application No. PCT/CN2017/082063, filed on Apr. 26, 2017, which claims the benefit of priority of Chinese Patent Application No. 201610629969.4, filed on Aug. 4, 2016, and Chinese Patent Application No. 201610831736.2, filed on Sep. 19, 2016. The entire contents of the before-mentioned patent applications are incorporated by reference as part of the disclosure of this application.

TECHNICAL FIELD

The present disclosure relates to the field of wireless communications, and in particular, relates to a signal transmission method and device, and a computer storage medium in a mobile communication system.

BACKGROUND

A new-generation mobile communication system will perform system networking at a carrier frequency higher than those used in the second generation (2G), third generation (3G) and fourth generation (4G) systems. Frequency bands which are currently widely recognized in the industry and by international organizations are mainly 3 GHz-6 GHz and 6 GHz-100 GHz. These frequency bands substantially belong to a centimeter band or a millimeter band, and the propagation characteristics of these frequency bands are significantly different from those of lower frequency bands. Since the propagation loss of higher frequency bands is significantly larger than that of lower frequency bands, the coverage range of higher frequency bands is generally far smaller than that of lower frequency bands. To enlarge the coverage range of higher frequency bands, a beamforming technology is generally adopted, so that the wireless signal energy is narrowed and more concentrated on devices that need to communicate with each other.

Since the beam is narrow, in order to accurately focus the beam on the device that needs to communicate, beam training is required to obtain the optimal or sub-optimal beam. Typical scenarios for the beam training are as follows. The first scenario is: in an initial access process in which available beams are to be searched for without any beam information, which is a coarse search. The second scenario is: in a communication process after access in which more accurate search and training are needed, because in the beam training of the first scenario, the beam search does not necessarily select the optimal beam but only the available beam exceeding the minimum threshold in order to reduce the access delay. The third scenario is: the beam maintenance and tracking function, the optimal beam also needs to be adjusted due to the movement of the terminal or the change of the surrounding environment.

In the new-generation mobile communication system, the new radio (NR), all beams cannot be traversed at one time point due to the limitation of the radio channel capability of the device. Only part of the beams can be transmitted or received at a same time point. Therefore, a beam sweep needs to be undergone in the initial access, and the process of the beam sweep traversal is in a time division order. As shown in FIG. 1, the NR system only has two channels for transmitting the radio frequency (RF), but seven beams to be formed. In order to traverse all of the beams, two beams are required in one group for sweeping, and a total of four groups are required.

As described above, the beam training is divided into a coarse search and a fine search. Generally, the fine search is performed after the coarse search, and the entire training process is completed after the two searches are completed. Since the beam sweep needs to traverse all the beams, the time consumed is long, and thus the access time is also long. This affects the indicator of the access delay. In particular, the quality of the handover is degraded when the access is too long during the handover.

SUMMARY

In order to solve the technical problem described above, embodiments of the present disclosure provide a signal transmission method and device, and a computer storage medium thereof, for solving the problem of sweep sending and receiving of training signals during the initial access and synchronous tracking, and reducing the delay of signal training.

A signal transmission method provided by an embodiment of the present disclosure includes:
  sending or receiving, by a base station, a signal within an access signal time interval, where the access signal time interval includes sweeping time blocks (STB).

The access signal time interval is a downlink access signal time interval or an uplink access signal time interval, and the base station sends the signal over the downlink access signal time interval, or receives the signal over the uplink access signal time interval.

In the present disclosure, a time domain or frequency domain distribution density of the uplink access signal time interval is greater than or equal to a time domain or frequency domain distribution density of the downlink access signal time interval.

In the present disclosure, one downlink access signal time interval corresponds to a plurality of uplink access signal time intervals.

In the present disclosure, STBs in the downlink access signal time interval are in one-to-one correspondence with STBs in the uplink access signal time interval.

In the present disclosure, STBs in the downlink access signal time interval include one or more of the following signals: a synchronization signal (SS), a message signal (MSG), and a measurement reference signal (MRS).

In the present disclosure, the STBs have one or more of the following types of STBs:
  a first type STB, which includes the SS, the MSG, and the MRS;
  a second type STB, which merely includes the MRS;
  a third type STB, which merely includes the SS and the MSG; and
  a fourth type STB, which merely includes the SS.

In the present disclosure, the number of orthogonal frequency division multiplexing (OFDM) symbols occupied by the first type STB is greater than or equal to the number of OFDM symbols occupied by the second type STB.

In the present disclosure, the message signal carries a demodulation reference signal of the message signal.

In the present disclosure, the message signal and the synchronization signal are transmitted by using a same port or beam.

In the present disclosure, port numbers of the synchronization signals in different STBs are different; or port numbers of the message signals in different STBs are different.

In the present disclosure, the method further includes:
obtaining, by the base station, port information of the synchronization signal when the base station receives an uplink access signal of a terminal over the uplink access signal time interval.

In the present disclosure, the method further includes:
sending, by the base station, a random access response message by using a port or beam of the synchronization signal.

In the present disclosure, the measurement reference signal and the synchronization signal and/or the message signal are frequency division multiplexed, and the measurement reference signal and the synchronization signal and/or the message signal in one sweeping time block are disposed in a same OFDM symbol.

In the present disclosure, the measurement reference signal and the synchronization signal and/or the message signal use different ports.

In the present disclosure, ports of different measurement reference signals use different time/frequency domain resources and/or code resources.

In the present disclosure, the method further includes:
obtaining, by the base station, information of the measurement reference signal in response to the base station receives an uplink access signal from a terminal over the uplink access signal time interval, where the information of the measurement reference signal includes at least a port number of the measurement reference signal.

In the present disclosure, the method further includes:
sending, by the base station, a random access response message by using a synchronization signal port, a message signal port, or an MRS port.

In the present disclosure, multiple ports of the measurement reference signal are capable of forming a synchronization signal and/or message signal port.

In the present disclosure, the multiple ports of measurement reference signals from within one STB form the port of the synchronization signal and/or message signal; or the multiple ports of the measurement reference signals from within a plurality of STBs form the port of the synchronization signal and/or the message signal.

In the present disclosure, the message signal indicates one or more of:
indication information of the downlink access signal time interval and/or the STBs in the downlink access signal time interval;
indication information of the uplink access signal time interval and/or the STBs in the uplink access signal time interval;
information of STBs for sending an uplink access signal;
indication information of the access signal time interval carrying various types of STBs;
configuration information of the uplink access signal;
configuration information of the MRS, where the configuration information includes one or more of: the number of ports of the MRS, configuration information of a time/frequency domain resource of the MRS, and configuration information of a code domain resource;
configuration information of a system message;
configuration information of the message signal; and
configuration information of the STBs.

In the present disclosure, the indication information of the uplink/downlink access signal time interval refers to time/frequency domain position information of the access signal time interval and/or time/frequency domain position information of the STBs.

In the present disclosure, the time/frequency domain position information of the access signal time interval includes one or more of: a relative position of the access signal time interval to a radio frame boundary, time difference between the access signal time interval and the radio frame boundary, and an access signal time interval period.

The time/frequency domain position information of the STBs specifically refers to one or more of: a relative position of the STBs to an access signal time interval boundary or the radio frame boundary, and time difference between the STBs and the access signal time interval boundary or the radio frame boundary.

In the present disclosure, the information of the STBs for sending the uplink access signal is that: which STBs in the uplink access signal time interval are used by a terminal to send the uplink access signal.

In the present disclosure, STBs in the uplink access signal time interval used by the terminal to send the uplink access signal are determined in the following manner: notifying, by the base station, the terminal of the STBs for sending the uplink access signal, or obtaining from a mapping relationship between the STBs in the downlink access signal time interval and the STBs in the uplink access signal time interval, or notifying, by the base station, the terminal of the number of STBs occupied for sending the uplink access signal within one uplink access signal time interval.

In the present disclosure, the configuration information of the uplink access signal includes one or more of:
a time/frequency domain resource or resource pool used by the uplink access signal; and
a code domain resource or resource pool used by the uplink access signal.

The resource or resource pool has a mapping relationship with a synchronization signal port, a message signal port, or an MRS port, and the mapping relationship is implicit or indicated in signaling.

In the present disclosure, the configuration information of the uplink access signal is an uplink access configuration set index.

In the present disclosure, content directed to by the uplink access configuration set index is obtained through a system access configuration set.

In the present disclosure, the system access configuration set at least includes one or more of:
a time/frequency domain resource or resource pool used by the uplink access signal;
a code domain resource or resource pool; and
a mapping relationship between the resource and a synchronization signal port, a message signal port, or an MRS port.

In the present disclosure, the message signal has types of:
a first type MSG, which merely includes part of information in an information set; and
a second type MSG, which includes more pieces of information than that of information included in the first type MSG.

In the present disclosure, the part of information included in the first type MSG or the configuration information of the message signal includes time/frequency position or period information of the access signal time interval and the STBs.

In the present disclosure, the first type MSG further includes position or period information of the second type MSG or the configuration information of the message signal, which configures a position or period of an extension message.

In the present disclosure, the method further includes:
after receiving, by the base station, an uplink access signal over the uplink access signal time interval, indicating indication information of one or more uplink access signal time intervals, or indicating indication information of one or more uplink access signal time intervals and STBs in a message fed back to a terminal.

A signal transmission method provided by another embodiment of the present disclosure includes:
sending or receiving, by a terminal, a signal within an access signal time interval, where the access signal time interval includes STBs.

The access signal time interval is an uplink access signal time interval or a downlink access signal time interval, and the terminal sends the signal over the uplink access signal time interval, or receives the signal over the downlink access signal time interval.

In the present disclosure, the access signal time interval is comprised of a plurality of consecutive or discrete STBs. The plurality of STBs are repeated sending of one STB, or are comprised of STBs of different content or different send ports.

In the present disclosure, the terminal sends one or more uplink access signals in a STB. The one or more uplink access signals at least include any one of: a cyclic prefix (CP), a preamble, guard time (GT), and a random access message.

In the present disclosure, the random access message includes: an access control channel and access data.

In the present disclosure, the plurality of uplink access signals in the STB belong to a same terminal user or different terminal users.

In the present disclosure, sequences selected as the preambles of a plurality of uplink access signals in the STB are different.

In the present disclosure, time and frequency resource positions of the one or more uplink access signals in the STB are determined according to received time, frequency, code domain or antenna port information of a downlink signal.

In the present disclosure, a sequence of the preamble of the one or more uplink access signals in the STB is consisted of a plurality of sequence elements; and the plurality of sequence elements are repetitions of any one of the plurality of sequence elements, or different sequence elements.

In the present disclosure, the terminal simultaneously or continuously sends a plurality of uplink random access signals before the terminal receives a random access response of an uplink access signal.

In the present disclosure, a random access response (RAR) signal received by the terminal at least indicates a preamble sequence corresponding to the RAR signal, or indicates sequence elements in the preamble sequence corresponding to the RAR signal.

In the present disclosure, a time/frequency domain distribution density of the uplink access signal time interval is greater than or equal to a time/frequency domain distribution density of the downlink access signal time interval.

In the present disclosure, one downlink access signal time interval corresponds to a plurality of uplink access signal time intervals.

In the present disclosure, STBs in the downlink access signal time interval are in one-to-one correspondence with STBs in the uplink access signal time interval.

In the present disclosure, the method further includes:
sending, by the terminal, an uplink access signal within a plurality of uplink access signal time intervals before the terminal receives a random access request response signal from a base station.

In the present disclosure, the method further includes:
after sending, by the terminal, an uplink random access over the uplink access signal time interval, determining a transmit port according to indication information, fed back by a base station, indicating that one or more base stations receive the uplink access signal time interval.

In the present disclosure, STBs in the downlink access signal time interval received by the terminal includes one or more of the following signals: an SS, an MSG, and an MRS.

In the present disclosure, the method further includes:
determining, by the terminal, a time period corresponding to an uplink STB for sending an uplink access signal according to an implicit mapping manner, for indicating a downlink STB and an uplink STB, in the message signal sent by a base station.

In the present disclosure, the method further includes:
mapping or inserting, by the terminal, a downlink synchronization signal port number, a message signal port number, or an MRS port number to an uplink access signal and sending a random access signal, or sending the random access signal in a manner where a resource occupied by the downlink synchronization signal, the message signal or the MRS is mapped to a resource of the uplink access signal.

In the present disclosure, the terminal receives the measurement reference signal and any one or two of the following signals: the synchronization signal and the message signal, in a same OFDM symbol, and the measurement reference signal is frequency division multiplexed with any one or two of the following signals: the synchronization signal and the message signal.

In the present disclosure, content of the message signal received by the terminal includes one or more of:
indication information of the downlink access signal time interval and/or the STBs in the downlink access signal time interval;
indication information of the uplink access signal time interval and/or the STBs in the uplink access signal time interval;
information of STBs for sending an uplink access signal;
indication information of a base station downlink access signal time interval carrying various types of STBs;
configuration information of the uplink access signal;
configuration information of the downlink MRS, where the configuration information includes one or more of: the number of ports of the MRS, configuration information of a time/frequency domain resource of the MRS, and configuration information of a code domain resource;
configuration information of a system message;
configuration information of the message signal; and
configuration information of the STBs.

In the present disclosure, the method further includes:
after receiving, by the terminal, a first type MSG, obtaining position or period information of a second type MSG in the first type MSG.

In the present disclosure, the terminal determines a mapping relationship between a received random access response message and a received downlink synchronization signal port, message signal port or MRS port number.

In the present disclosure, time/frequency domain position information of the access signal time interval received by the terminal includes: a relative position of the access signal time interval to a radio frame boundary, or time difference between the access signal time interval and the radio frame boundary, or an access signal time interval period.

In the present disclosure, time/frequency domain position information of the STB received by the terminal includes: a relative position of the STB to an access signal time interval boundary or a radio frame boundary, or time difference between the STB and the access signal time interval boundary or the radio frame boundary.

In the present disclosure, the indication information of the STBs for sending the uplink access signal is that: which STBs in the uplink access signal time interval are used by a terminal to send the uplink access signal.

In the present disclosure, STBs in the uplink access signal time interval used by the terminal to send the uplink access signal are determined in the following manner: notifying, by the base station, the terminal of the STBs for sending the uplink access signal, or obtaining from a mapping relationship between the STBs in the downlink access signal time interval and the STBs in the uplink access signal time interval, or notifying, by the base station, the terminal of the number of STBs occupied for sending the uplink access signal within one uplink access signal time interval.

In the present disclosure, the configuration information of the uplink access signal received by the terminal includes one or more of:
  a time/frequency domain resource or resource pool used by the uplink access signal;
  a code domain resource or resource pool used by the uplink access signal; and
  a mapping relationship between the resource and a synchronization signal port, a message signal port, or an MRS port.

In the present disclosure, the configuration information of the uplink access signal is an uplink access configuration set index.

In the present disclosure, content directed to by the uplink access configuration set index is obtained through a system access configuration set.

In the present disclosure, the system access configuration set at least includes one or more of:
  a time/frequency domain resource or resource pool used by the uplink access signal;
  a code domain resource or resource pool used by the uplink access signal; and
  a mapping relationship between the resource or resource pool and a synchronization signal port, a message signal port, or an MRS port.

In the present disclosure, the terminal determines the time/frequency domain resource and the code resource used by the uplink access signal according to a mapping relationship between the time/frequency domain resource pool, the code domain resource pool, or a predicted resource used by the uplink access signal and the synchronization signal port, the message signal port, or the MRS port.

In the present disclosure, the terminal determines a time/frequency domain resource and a code resource used for receiving uplink access response message according to a mapping relationship between a time/frequency domain resource pool or a predicted resource of the uplink access response information and the synchronization signal port, the message signal port, or the MRS port.

A signal transmission device provided by an embodiment of the present disclosure is applied to a base station, and includes:
  a transmission unit, which is configured to send or receive a signal within an access signal time interval which is comprised of STBs;
  The access signal time interval is a downlink access signal time interval or an uplink access signal time interval, and the base station sends the signal over the downlink access signal time interval, or receives the signal over the uplink access signal time interval.

In the present disclosure, a time/frequency domain distribution density of the uplink access signal time interval is greater than or equal to a time/frequency domain distribution density of the downlink access signal time interval.

In the present disclosure, STBs in the downlink access signal time interval are in one-to-one correspondence with STBs in the uplink access signal time interval.

In the present disclosure, STBs in the downlink access signal time interval includes one or more of the following signals: an SS, an MSG, and an MRS.

In the present disclosure, the STBs have one or more the following types of STBs:
  a first type STB, which includes the SS, the MSG, and the MRS;
  a second type STB, which merely includes the MRS;
  a third type STB, which merely includes the SS and the MSG; and
  a fourth type STB, which merely includes the SS.

In the present disclosure, the message signal carries a demodulation reference signal of the message signal.

In the present disclosure, the message signal and the synchronization signal are transmitted by using a same port or beam.

In the present disclosure, port numbers of the synchronization signals in different STBs are different; or port numbers of the message signals in different STBs are different.

In the present disclosure, the measurement reference signal and the synchronization signal and/or the message signal are frequency division multiplexed, and the measurement reference signal and the synchronization signal and/or the message signal in one sweeping time block are located in a same OFDM symbol.

In the present disclosure, the measurement reference signal and the synchronization signal and/or the message signal use different ports.

In the present disclosure, ports of different measurement reference signals use different time/frequency domain resources and/or code resources.

In the present disclosure, multiple ports of the measurement reference signal are capable of forming a synchronization signal and/or message signal port.

In the present disclosure, the message signal indicates one or more of:
  indication information of the downlink access signal time interval and/or the STBs in the downlink access signal time interval;
  indication information of the uplink access signal time interval and/or the STBs in the uplink access signal time interval;
  information of STBs for sending an uplink access signal;
  indication information of the access signal time interval carrying various types of STBs;
  configuration information of the uplink access signal;

configuration information of the MRS, where the configuration information includes one or more of: the number of ports of the MRS, configuration information of a time/frequency domain resource of the MRS, and configuration information of a code domain resource;
configuration information of a system message;
configuration information of the message signal; and
configuration information of the STBs.

In the present disclosure, the message signal has types of:
a first type MSG, which merely includes part of information in an information set; and
a second type MSG, which includes information more pieces of information than that of information included in the first type MSG.

In the present disclosure, the device further includes:
a processing unit, which is configured to indicate indication information of one or more uplink access signal time intervals, or indicate indication information of one or more uplink access signal time intervals and STBs in a message fed back to a terminal after the transmission unit receives an uplink access signal over the uplink access signal time interval.

In the present disclosure, the transmission unit is further configured to send a random access response message on a time/frequency domain resource and a code domain resource mapped by a synchronization signal port, a message signal port or an MRS port number.

A signal transmission device provided by another embodiment of the present disclosure is applied to a terminal, and includes:
a transmission unit, which is configured to send or receive a signal within an access signal time interval, where access signal time interval includes STBs;
The access signal time interval is an uplink access signal time interval or a downlink access signal time interval, and the terminal sends the signal over the uplink access signal time interval, or receives the signal over the downlink access signal time interval.

In the present disclosure, the access signal time interval includes a plurality of consecutive or discrete STBs.

The plurality of STBs are repeated sending of one STB, or are comprised of STBs of different content or different send ports.

In the present disclosure, the transmission unit is configured to send one or more uplink access signals in a STB.

The one or more uplink access signals at least include any one of: a CP, a preamble, GT, and a random access message.

In the present disclosure, the random access message includes: an access control channel and access data.

In the present disclosure, the plurality of uplink access signals in the STB belong to a same terminal user or different terminal users.

In the present disclosure, sequences selected as the preambles of a plurality of uplink access signals in the STB are different.

In the present disclosure, time and frequency resource positions of the one or more uplink access signals in the STB is determined according to received time, frequency, code domain or antenna port information of a downlink signal.

In the present disclosure, a sequence of the preamble of the one or more uplink access signals in the STB is consisted of a plurality of sequence elements; and the plurality of sequence elements are repetitions of any one of the plurality of sequence elements, or different sequence elements.

In the present disclosure, the transmission unit simultaneously or continuously sends a plurality of uplink random access signals before the transmission unit receives a random access response of an uplink access signal.

In the present disclosure, a random access response (RAR) signal received by the transmission unit at least indicates a preamble sequence corresponding to the RAR signal, or indicates sequence elements in the preamble sequence corresponding to the RAR signal.

In the present disclosure, a time/frequency domain distribution density of the uplink access signal time interval is greater than or equal to a time/frequency domain distribution density of the downlink access signal time interval.

In the present disclosure, STBs in the downlink access signal time interval is in one-to-one correspondence with STBs in the uplink access signal time interval.

In the present disclosure, the transmission unit is further configured to send an uplink access signal within a plurality of time windows of the uplink access signal time interval.

The device further includes: a switching unit, which is configured to perform transmit port switching, and does not need to wait for a base station to determine a random access signal or wait for an end of a timing window when a transmit port is switched.

In the present disclosure, the device further includes:
a processing unit, which is configured to determine a transmit port according to indication information, fed back by a base station, indicating that one or more base stations receive the downlink access signal time interval after the transmission unit sends an uplink random access over the uplink access signal time interval.

In the present disclosure, STBs in the downlink access signal time interval received by the terminal includes one or more of the following signals: an SS, an MSG, and an MRS.

In the present disclosure, the device further includes:
a processing unit, which is configured to determine a time period corresponding to an uplink STB for sending an uplink access signal according to a mapping manner of indicating by the message signal sent by a base station or sending the STB by the base station.

In the present disclosure, the transmission unit is further configured to map or insert a downlink synchronization signal port, a message signal port, or an MRS port number to an uplink access signal and send a random access signal, or send the random access signal in an implicit manner of mapping with the downlink MRS resource.

In the present disclosure, the transmission unit is further configured to receive the measurement reference signal and the synchronization signal and/or the message signal in a same OFDM symbol. The measurement reference signal and the synchronization signal and/or the message signal are frequency division multiplexed.

In the present disclosure, content of the message signal received by the terminal includes one or more of:
indication information of the downlink access signal time interval and/or the STBs in the access signal time interval;
indication information of the uplink access signal time interval and/or the STBs in the access signal time interval;
information of STBs for sending an uplink access signal;
indication information of the access signal time interval carrying various types of STBs;
configuration information of the uplink access signal;
configuration information of the downlink MRS, where the configuration information includes one or more of: the number of ports of the MRS, configuration information of a time/frequency domain resource of the MRS, and configuration information of a code domain resource;

configuration information of a system message; configuration information of the message signal; and configuration information of the STBs.

In the present disclosure, the device further includes:

a processing unit, which is configured to obtain position or period information of a second type MSG in a first type MSG after the processing unit receives the first type MSG.

In the present disclosure, the terminal determines a mapping relationship between a received random access response message and a received downlink synchronization signal port, message signal port or MRS port number.

A computer storage medium provided by an embodiment of the present disclosure stores computer programs which are configured to execute the signal transmission method described above.

In the technical solution of the present disclosure, a base station sends or receives a signal within an access signal time interval which includes STBs. The access signal time interval includes a downlink access signal time interval and an uplink access signal time interval. The base station sends the signal over the downlink access signal time interval, and receives the signal over the uplink access signal time interval. Correspondingly, a terminal sends or receives a signal within an access signal time interval which includes STBs. The access signal time interval includes a downlink access signal time interval and an uplink access signal time interval. The terminal sends the signal over the downlink access signal time interval, and receives the signal over the uplink access signal time interval. In this way, a signal transmission method is specially designed for the sweeping of a training signal, which achieves the sweep sending and receiving of the training signal during the initial access and the synchronous tracking, and reduces the delay of the signal training.

BRIEF DESCRIPTION OF DRAWINGS

The drawings generally illustrate various embodiments discussed in the present disclosure by way of examples not limitations.

DETAILED DESCRIPTION

Figure 1:
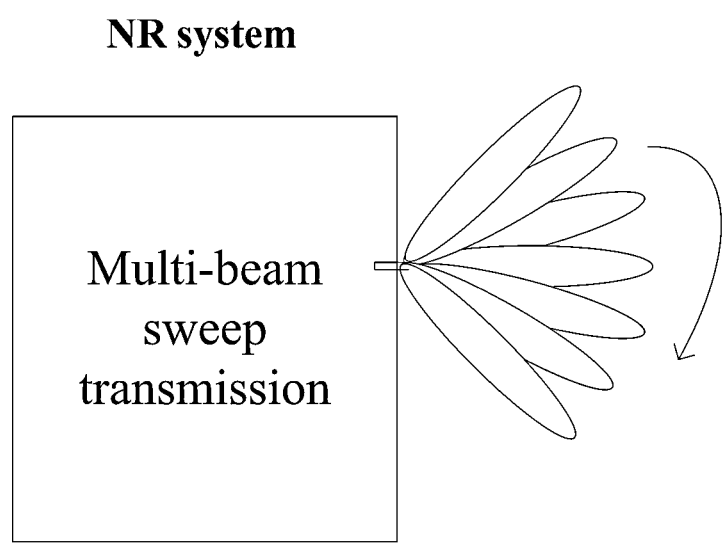
FIG. 1 is a schematic diagram of a beam sweep.

To provide a more detailed understanding of features and technical contents of embodiments of the present disclosure, implementation of the embodiments of the present disclosure is described below in detail in conjunction with the drawings. The drawings are provided for reference only and are not intended to limit the embodiments of the present disclosure.

A subframe or a time interval exclusively for sending a sweep signal has great difference in functions from a subframe or a time interval for sending a normal data service. Therefore, a signal transmission method is specifically designed for a sweep of the training signal by the embodiment of the present disclosure, to minimize the sweep time consumption of the coarse search and the fine search. Subframes and time intervals are both units of time. If the length of time is the same, the subframe may be equated with the time interval.

A subframe or a time interval for sending a sweep signal is generally used for sending a downlink access signal or an uplink access signal, and thus the subframe or the time interval for sending the sweep signal may also be referred as a subframe or a time interval for sending an access signal. The access signal herein include, but is not limited to, a synchronization signal, a signal in a broadcast channel, a random access signal, a scheduling request signal, and the like.

For normal operation of a wireless system and a terminal device, the downlink access signal and the uplink access signal need to be provided respectively. The access signal is an essential signal for the wireless system. In the practical operation of the communication system and the terminal, the access signal needs to be continuously swept and transmitted. In addition to the access signal, other signals, such as reference signals used to measure, maintain, and track synchronization and channel conditions, also need to be swept and transmitted, so a time segment likewise carrying the sweep signal and other signals required to be swept in an access process may be referred as a sweep time interval (STI), and is classified into a downlink transmit sweep time interval (DL TX sweep time interval) and an uplink receive sweep time interval (UL RX sweep time interval) from the perspective of a base station. Correspondingly, the time segment is classified into a downlink receive sweep time interval (DL RX sweep time interval) and an uplink transmit sweep time interval (UL TX sweep time interval) from the perspective of a terminal. The subframe or the time interval for sending the sweep signal is generally used for sending the downlink access signal or the uplink access signal, and thus the subframe or the time interval for sending the sweep signal may also be referred as the subframe or the time interval for sending the access signal. The access signal herein include, but is not limited to, the synchronization signal, the signal in the broadcast channel, the random access signal, the scheduling request signal, and the like. In a real system definition, the time segment is not necessarily named as the STI, but belongs to the category of the STI as long as the time interval is related to the sweep and the access.

In the embodiments described below of the present disclosure, the STI as the access signal time interval is taken as an example for illustration. The STI in the embodiments described below may be equally replaced by any access signal time interval for understanding.

Figures 5, 6:
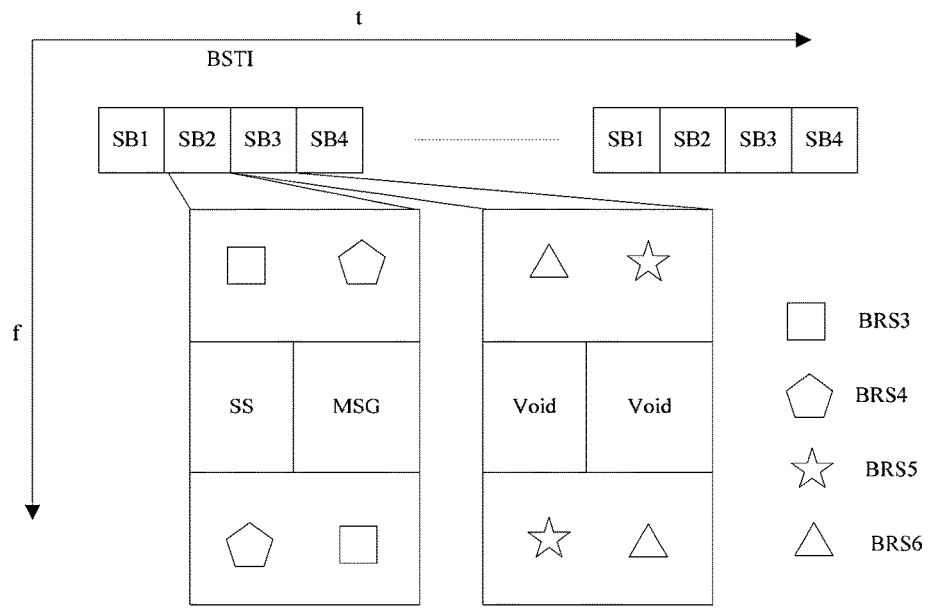
FIG. 5 is a schematic diagram 2 illustrating a solution to the problem of insufficient MRS resources according to the embodiment of the present disclosure.
FIG. 6 is a flowchart 1 of a signal transmission method according to an embodiment of the present disclosure.

FIG. 6 is a flowchart 1 of a signal transmission method according to an embodiment of the present disclosure. The signal transmission method in the embodiment is applied in a base station side. As shown in FIG. 6, the signal transmission method includes steps described below.

In a step S601, a base station sends or receives a signal within an STI, where the STI consists of STBs. The STI is a downlink STI or an uplink STI. The base station sends the signal over the downlink STI, or receives the signal over the uplink STI.

In the embodiment of the present disclosure, a time/frequency domain distribution density of the uplink STI is greater than or equal to a time/frequency domain distribution density of the downlink STI.

In the embodiment of the present disclosure, one downlink STI corresponds to a plurality of uplink STIs.

In the embodiment of the present disclosure, STBs in the downlink STI are in one-to-one correspondence with STBs in the uplink STI.

In the present disclosure, STBs in the downlink STI include one or more of the following signals: an SS, an MSG, and an MRS.

In the present disclosure, the STBs have one or more of the following types: a first type STB, a second type STB, a third type STB, and a fourth type STB.

The first type STB includes the SS, the MSG, and the MRS.

The second type STB merely includes the MRS.

The third type STB only includes the SS and the MSG.

The fourth type STB merely includes the SS.

In the embodiment of the present disclosure, the number of OFDM symbols occupied by the first type STB is greater than or equal to the number of OFDM symbols occupied by the second type STB.

In the embodiment of the present disclosure, the message signal carries a demodulation reference signal of the message signal.

In the embodiment of the present disclosure, the message signal and the synchronization signal are transmitted by using the same port or beam.

In the embodiment of the present disclosure, port numbers of the synchronization signals in different STBs are different; or port numbers of the message signals in different STBs are different.

In the embodiment of the present disclosure, the method further includes a step described below.

The base station obtains port information of the synchronization signal when the base station receives an uplink access signal of a terminal over the uplink STI.

In the embodiment of the present disclosure, the method further includes a step described below.

The base station sends a random access response message by using a port or beam of the synchronization signal.

In the embodiment of the present disclosure, the measurement reference signal and the synchronization signal and/or the message signal are frequency division multiplexed, and the measurement reference signal and the synchronization signal and/or the message signal in one STB are located in the same OFDM symbol.

In the embodiment of the present disclosure, the measurement reference signal and the synchronization signal and/or the message signal use different ports.

In the embodiment of the present disclosure, ports of different measurement reference signals use different time/frequency domain resources and/or code resources.

In the embodiment of the present disclosure, the method further includes a step described below.

The base station obtains information of the measurement reference signal in response to the base station receives an uplink access signal from a terminal over the uplink STI, where the information of the measurement reference signal includes at least a port number of the measurement reference signal.

In the embodiment of the present disclosure, the method further includes a step described below.

The base station sends a random access response message by using a synchronization signal port, a message signal port, or an MRS port.

In the embodiment of the present disclosure, multiple ports of the measurement reference signals are capable of forming a port of the synchronization signal and/or a port of the message signal.

In the embodiment of the present disclosure, ports of measurement reference signals from within one STB form the port of the synchronization signal and/or the port of the message signal.

Or ports of the measurement reference signals from within a plurality of STBs form the port of the synchronization signal and/or the port of the message signal.

In the embodiment of the present disclosure, the message signal indicates one or more of:
  indication information of the downlink STI and/or the STBs in the downlink STI;
  indication information of the uplink STI and/or the STBs in the uplink STI;
  indication information of STBs for sending an uplink access signal;
  indication information of the STI carrying various types of STBs;
  configuration information of the uplink access signal;
  configuration information of the MRS, where the configuration information includes one or more of: the number of ports of the MRS, configuration information of a time/frequency domain resource of the MRS, and configuration information of a code domain resource;
  configuration information of a system message;
  configuration information of the message signal; and
  configuration information of the STBs.

In the embodiment of the present disclosure, the time/frequency domain position of the STI is: a relative position of the STI to a radio frame boundary, or time difference between the STI and the radio frame boundary, or an STI period.

In the embodiment of the present disclosure, the time/frequency domain position information of the STBs is: a relative position of the STBs to an STI boundary or the radio frame boundary, or time difference between the STBs and the STI boundary or the radio frame boundary.

In the embodiment of the present disclosure, the indication information of the uplink/downlink STI refers to time/ frequency domain position information of the STI and/or time/frequency domain position information of the STBs.

Specifically, the time/frequency domain position information of the STI includes one or more of: a relative position of the STI to a radio frame boundary, time difference between the STI and the radio frame boundary, and an STI period.

The time/frequency domain position information of the STBs specifically refers to one or more of: a relative position of the STBs to an STI boundary or the radio frame boundary, and time difference between the STBs and the STI boundary or the radio frame boundary.

In the embodiment of the present disclosure, the information of the STBs for sending the uplink access signal is that: which STBs in the uplink STI are used by a terminal to send the uplink access signal.

Specifically, STBs in the uplink STI used by the terminal to send the uplink access signal are determined by: notifying, by the base station, the terminal of the STBs for sending the uplink access signal, or obtaining from a mapping relationship between the STBs in the downlink STI and the STBs in the uplink STI, or notifying, by the base station, the terminal of the number of STBs occupied for sending the uplink access signal within one uplink STI.

In the embodiment of the present disclosure, the configuration information of the uplink access signal includes one or more of:
  a time/frequency domain resource or resource pool used by the uplink access signal; and
  a code domain resource or resource pool used by the uplink access signal.

The resource or resource pool has a mapping relationship with a synchronization signal port, a message signal port, or an MRS port, and the mapping relationship is implicit or indicated in signaling.

In the embodiment of the present disclosure, the configuration information of the uplink access signal is an uplink access configuration set index.

In the embodiment of the present disclosure, content directed to by the uplink access configuration set index is obtained through a system access configuration set.

In the embodiment of the present disclosure, the system access configuration set at least includes one or more of:
  a time/frequency domain resource or resource pool used by the uplink access signal; and
  a code domain resource or resource pool; and
  a mapping relationship between the resource and a synchronization signal port, a message signal port, or an MRS port.

In the embodiment of the present disclosure, the message signal has types of: a first type MSG and a second type MSG.

The first type MSG only includes part of information in an information set.

The second type MSG includes more pieces of information than that of information included in the first type MSG.

In the embodiment of the present disclosure, the part of information included in the first type MSG or the configuration information of the message signal includes time/frequency position or period information of the STI and the STBs.

In the embodiment of the present disclosure, the first type MSG further includes position or period information of the second type MSG or the configuration information of the message signal, which configures a position or period of an extension message.

In the embodiment of the present disclosure, the method further includes a step described below.

After the base station receives an uplink access signal over the uplink STI, the base station indicates indication information of one or more uplink STIs, or indicates indication information of one or more uplink STIs and STBs in a message fed back to a terminal.

Figures 7, 8:
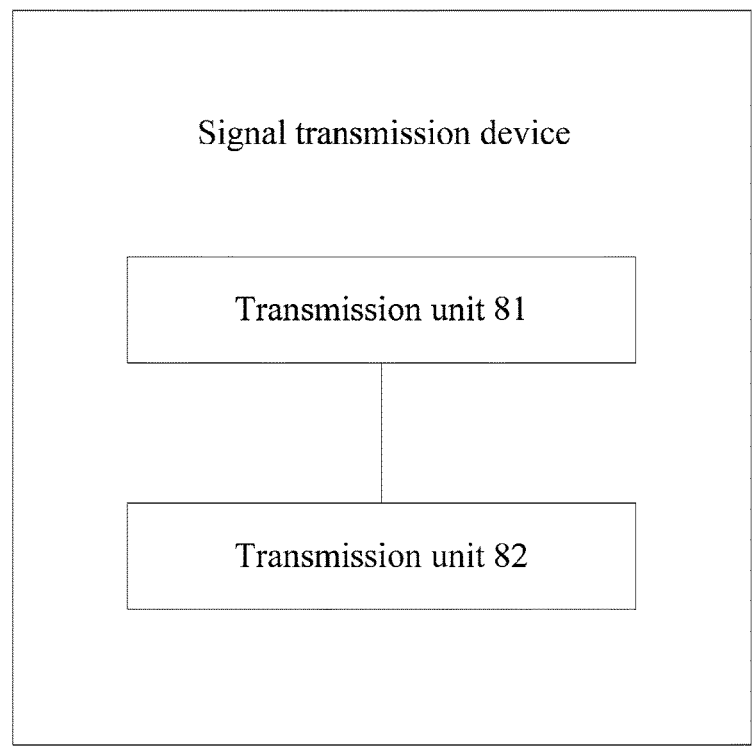
FIG. 7 is a flowchart 2 of a signal transmission method according to an embodiment of the present disclosure.
FIG. 8 is a structural diagram 1 of a signal transmission device according to an embodiment of the present disclosure.

FIG. 7 is a flowchart 2 of a signal transmission method according to an embodiment of the present disclosure. The signal transmission method in the embodiment is applied in a terminal side. As shown in FIG. 7, the signal transmission method includes steps described below.

In a step S701, a terminal sends or receives a signal within an STI, where the STI consists of STBs. The STI is an uplink STI or a downlink STI. The terminal sends the signal over the uplink STI, or receives the signal over the downlink STI.

In the embodiment of the present disclosure, the STI is consisted of a plurality of consecutive or discrete STBs.

The plurality of STBs are repeated sending of one STB, or are consisted of STBs of different content or different send ports.

In the embodiment of the present disclosure, the terminal sends one or more uplink access signals in a STB.

The one or more uplink access signals at least include any one of: a CP, a preamble, GT, and a random access message.

In the embodiment of the present disclosure, the random access message includes: an access control channel and access data.

In the embodiment of the present disclosure, the plurality of uplink access signals in the STB belong to the same terminal user or different terminal users.

In the embodiment of the present disclosure, sequences selected as the preambles of a plurality of uplink access signals in the STB are different.

In the embodiment of the present disclosure, time and frequency resource positions of the one or more uplink access signals in the STB is determined according to received time, frequency, code domain or antenna port information of a downlink signal.

In the embodiment of the present disclosure, a sequence of the preamble of the one or more uplink access signals in the STB is consisted of a plurality of sequence elements; and the plurality of sequence elements are repetitions of any one of the plurality of sequence elements, or different sequence elements.

In the embodiment of the present disclosure, the terminal simultaneously or continuously sends a plurality of uplink random access signals before the terminal receives a random access response (RAR) signal of an uplink access signal.

In the embodiment of the present disclosure, a random access response received by the terminal at least indicates a preamble sequence corresponding to the RAR signal, or indicates sequence elements in the preamble sequence corresponding to the RAR signal.

In the embodiment of the present disclosure, a time/frequency domain distribution density of the uplink STI is greater than or equal to a time/frequency domain distribution density of the downlink STI.

In the embodiment of the present disclosure, one downlink STI corresponds to a plurality of uplink STIs.

In the embodiment of the present disclosure, STBs in the downlink STI are in one-to-one correspondence with STBs in the uplink STI.

In the embodiment of the present disclosure, the method further includes a step described below.

The terminal sends an uplink access signal within a plurality of uplink STIs before the terminal receives a random access request response signal from a base station.

In the embodiment of the present disclosure, the method further includes a step described below.

After the terminal sends an uplink random access over the uplink STI, the terminal determines a transmit port according to indication information, fed back by a base station, indicating that one or more base stations receive the downlink STI.

In the embodiment of the present disclosure, STBs in the downlink STI received by the terminal includes one or more of the following signals: an SS, an MSG, and an MRS.

In the embodiment of the present disclosure, the method further includes a step described below.

The terminal determines a time period corresponding to an uplink STB for sending an uplink access signal according to an implicit mapping manner, for indicating a downlink STB and an uplink STB, in the message signal sent by a base station.

In the embodiment of the present disclosure, the method further includes a step described below.

The terminal maps or inserts a downlink synchronization signal port number, a message signal port number, or an MRS port number to an uplink access signal and sending a random access signal, or sends the random access signal in a manner where a resource occupied by the downlink synchronization signal, the message signal or the MRS is mapped to a resource of the uplink access signal.

In the embodiment of the present disclosure, the terminal receives the measurement reference signal and any one or two of the following signals: the synchronization signal and the message signal, in a same OFDM symbol, and the measurement reference signal is frequency division multiplexed with any one or two of the following signals: the synchronization signal and the message signal.

In the embodiment of the present disclosure, content of the message signal received by the terminal includes one or more of:
  indication information of the downlink STI and/or the STBs in the downlink STI;
  indication information of the uplink STI and/or the STBs in the uplink STI;
  indication information of STBs for sending an uplink access signal;
  indication information of a base station downlink STI carrying various types of STBs;
  configuration information of the uplink access signal;
  configuration information of the downlink MRS, where the configuration information includes one or more of: the number of ports of the MRS, configuration information of a time/frequency domain resource of the MRS, and configuration information of a code domain resource;
  configuration information of a system message;
  configuration information of the message signal; and
  configuration information of the STBs.

In the embodiment of the present disclosure, the method further includes a step described below.

After the terminal receives a first type MSG, the terminal obtains position or period information of a second type MSG in the first type MSG.

In the embodiment of the present disclosure, the terminal determines a mapping relationship between a received random access response message and a received downlink synchronization signal port, message signal port or MRS port number.

In the embodiment of the present disclosure, the time/frequency domain position information of the STI received by the terminal includes: a relative position of the STI to a radio frame boundary, or time difference between the STI and the radio frame boundary, or an STI period.

In the embodiment of the present disclosure, the time/frequency domain position information of the STBs received by the terminal includes: a relative position of the STBs to an STI boundary or the radio frame boundary, or time difference between the STBs and the STI boundary or the radio frame boundary.

In the embodiment of the present disclosure, the indication information of the STBs for sending the uplink access signal is that: which STBs in the uplink STI are used by a terminal to send the uplink access signal. STBs, in the uplink STI, used by the terminal to send the uplink access signal is determined by: notifying, by the base station, the terminal of the STBs for sending the uplink access signal, or obtaining from a mapping relationship between the STBs in the downlink STI and the STBs in the uplink STI, or notifying, by the base station, the terminal of the number of STBs occupied for sending the uplink access signal within one uplink STI.

In the embodiment of the present disclosure, the configuration information of the uplink access signal received by the terminal includes one or more of:
  a time/frequency domain resource or resource pool used by the uplink access signal;
  a code domain resource or resource pool used by the uplink access signal; and
  a mapping relationship between the resource and a synchronization signal port, a message signal port, or an MRS port.

In the embodiment of the present disclosure, the configuration information of the uplink access signal is an uplink access configuration set index.

In the embodiment of the present disclosure, content directed to by the uplink access configuration set index is obtained through a system access configuration set.

In the embodiment of the present disclosure, the system access configuration set at least includes one or more of:
  a time/frequency domain resource or resource pool used by the uplink access signal;
  a code domain resource or resource pool used by the uplink access signal; and
  a mapping relationship between the resource or resource pool and a synchronization signal port, a message signal port, or an MRS port.

In the embodiment of the present disclosure, the terminal determines the time/frequency domain resource and the code resource used by the uplink access signal according to a mapping relationship between the time/frequency domain resource pool, the code domain resource pool, or a predicted resource used by the uplink access signal and the synchronization signal port, the message signal port, or the MRS port.

In the present disclosure, the terminal determines a time/frequency domain resource and a code resource used for receiving uplink access response information according to a mapping relationship between a time/frequency domain resource pool or a predicted resource of the uplink access response information and the synchronization signal port, the message signal port, or the MRS port.

FIG. 8 is a structural diagram 1 of a signal transmission device according to an embodiment of the present disclosure. The device is applied to a base station and includes a transmission unit 81.

The transmission unit 81 is configured to send or receive a signal within an STI, where the STI consists of STBs.

The STI is a downlink STI or an uplink STI, and the base station sends the signal over the downlink STI, or receives the signal over the uplink STI.

In the embodiment of the present disclosure, a time/frequency domain distribution density of the uplink STI is greater than or equal to a time/frequency domain distribution density of the downlink STI.

In the embodiment of the present disclosure, STBs in the downlink STI are in one-to-one correspondence with STBs in the uplink STI.

In the embodiment of the present disclosure, STBs in the downlink STI includes one or more of the following signals: an SS, an MSG, and an MRS.

In the embodiment of the present disclosure, the STBs have one or more of the following types: a first type STB, a second type STB, a third type STB, and a fourth type STB.

The first type STB includes the SS, the MSG, and the MRS.

The second type STB merely includes the MRS.

The third type STB merely includes the SS and the MSG.

The fourth type STB merely includes the SS.

In the embodiment of the present disclosure, the message signal carries a demodulation reference signal of the message signal.

In the embodiment of the present disclosure, the message signal and the synchronization signal are transmitted by using the same port or beam.

In the embodiment of the present disclosure, port numbers of the synchronization signals in different STBs are different; or port numbers of the message signals in different STBs are different.

In the embodiment of the present disclosure, the measurement reference signal and the synchronization signal and/or the message signal are frequency division multiplexed, and the measurement reference signal and the synchronization signal and/or the message signal in one STB are located in the same OFDM symbol.

In the embodiment of the present disclosure, the measurement reference signal and the synchronization signal and/or the message signal use different ports.

In the embodiment of the present disclosure, ports of different measurement reference signals use different time/frequency domain resources and/or code resources.

In the embodiment of the present disclosure, multiple ports of the measurement reference signals are capable of forming a synchronization signal and/or message signal port.

In the embodiment of the present disclosure, the message signal indicates one or more of:

indication information of the downlink STI and/or the STBs in the downlink STI;

indication information of the uplink STI and/or the STBs in the uplink STI;

indication information of STBs for sending an uplink access signal;

indication information of the STI carrying various types of STBs;

configuration information of the uplink access signal;

configuration information of the MRS, where the configuration information includes one or more of: the number of ports of the MRS, configuration information of a time/frequency domain resource of the MRS, and configuration information of a code domain resource;

configuration information of a system message;

configuration information of the message signal; and configuration information of the STBs.

In the embodiment of the present disclosure, the message signal has types of: a first type MSG and a second type MSG.

The first type MSG only includes part of information in an information set.

The second type MSG includes more pieces of information than that of information included in the first type MSG.

In the embodiment of the present disclosure, the device further includes a processing unit 82.

The processing unit 82 is configured to indicate indication information of one or more uplink STIs, or indicate indication information of one or more uplink STIs and STBs in a message fed back to a terminal after the transmission unit 81 receives an uplink access signal over the uplink STI.

In the embodiment of the present disclosure, the transmission unit 81 is further configured to send a random access response message on a time/frequency domain resource and a code domain resource mapped by a synchronization signal port, a message signal port or an MRS port number.

It should be understood by those skilled in the art that implementation of functions of various units of the signal transmission device in FIG. 8 may be understood with reference to the related description of the foregoing signal transmission method.

In practical applications, functions implemented by various units in the signal transmission device may all be implemented by a central processing unit (CPU), or a microprocessor unit (MPU), or a digital signal processor (DSP), or a field programmable gate array (FPGA) or the like located in the signal transmission device.

Figure 9:
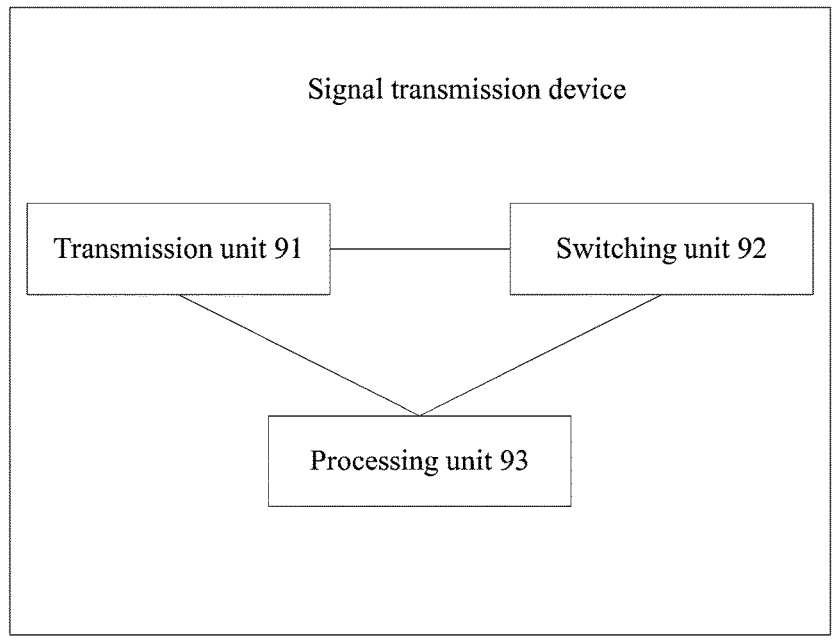
FIG. 9 is a structural diagram 2 of a signal transmission device according to an embodiment of the present disclosure.

FIG. 9 is a structural diagram 2 of a signal transmission device according to an embodiment of the present disclosure. The device is applied to a terminal and includes a transmission unit 91.

The transmission unit 91 is configured to send or receive a signal within an STI, where the STI consists of STBs.

The STI is an uplink STI or a downlink STI, and the base station sends the signal over the uplink STI, or receives the signal over the downlink STI.

In the embodiment of the present disclosure, the STI is consisted of a plurality of consecutive or discrete STBs.

The plurality of STBs are repeated sending of one STB, or are consisted of STBs of different content or different send ports.

In the embodiment of the present disclosure, the transmission unit 91 is configured to send one or more uplink access signals in a STB.

The one or more uplink access signals at least include any one of: a CP, a preamble, GT, and a random access message.

In the embodiment of the present disclosure, the random access message includes: an access control channel and access data.

In the embodiment of the present disclosure, the plurality of uplink access signals in the STB belong to the same terminal user or different terminal users.

In the embodiment of the present disclosure, sequences selected as the preambles of a plurality of uplink access signals in the STB are different.

In the embodiment of the present disclosure, time and frequency resource positions of the one or more uplink access signals in the STB is determined according to received time, frequency, code domain or antenna port information of a downlink signal.

In the embodiment of the present disclosure, a sequence of the preamble of the one or more uplink access signals in the STB is consisted of a plurality of sequence elements; and the plurality of sequence elements are repetitions of any one of the plurality of sequence elements, or different sequence elements.

In the embodiment of the present disclosure, the transmission unit 91 simultaneously or continuously sends a plurality of uplink random access signals before the transmission unit receives a random access response of an uplink access signal.

In the embodiment of the present disclosure, a random access response (RAR) signal received by the transmission unit 91 at least indicates a preamble sequence corresponding to the RAR signal, or indicates sequence elements in the preamble sequence corresponding to the RAR signal.

In the embodiment of the present disclosure, a time/frequency domain distribution density of the uplink STI is greater than or equal to a time/frequency domain distribution density of the downlink STI.

In the embodiment of the present disclosure, STBs in the downlink STI is in one-to-one correspondence with STBs in the uplink STI.

In the embodiment of the present disclosure, the transmission unit 91 is further configured to send an uplink access signal within a plurality of time windows of the uplink STI.

The device further includes: a switching unit 92, which is configured to perform transmit port switching, and does not need to wait for a base station to determine a random access signal or wait for an end of a timing window when a transmit port is switched.

In the embodiment of the present disclosure, the device further includes a processing unit 93.

The processing unit 93 is configured to determine a transmit port according to indication information, fed back by a base station, indicating that one or more base stations receive the downlink access signal time interval after the transmission unit 91 sends an uplink random access over the uplink STI.

In the embodiment of the present disclosure, STBs in the downlink STI received by the terminal includes one or more of the following signals: an SS, an MSG, and an MRS.

In the embodiment of the present disclosure, the processing unit 93 is configured to determine a time period corresponding to an uplink STB for sending an uplink access signal according to a mapping manner of indicating by the message signal sent by a base station or sending the STB by the base station.

In the embodiment of the present disclosure, the transmission unit 91 is further configured to map or insert a downlink synchronization signal port, a message signal port, or an MRS port number to an uplink access signal and send a random access signal, or send the random access signal in an implicit manner of mapping with the downlink MRS resource.

In the embodiment of the present disclosure, the transmission unit 91 is further configured to receive the measurement reference signal and the synchronization signal and/or the message signal in the same OFDM symbol. The measurement reference signal and the synchronization signal and/or the message signal are frequency division multiplexed.

In the embodiment of the present disclosure, content of the message signal received by the terminal is one or more of:
indication information of the downlink STI and/or the STBs in the downlink STI;
indication information of the uplink STI and/or the STBs in the uplink STI;
indication information of STBs for sending an uplink access signal;
indication information of the STI carrying various types of STBs;
configuration information of the uplink access signal;
configuration information of the downlink MRS, where the configuration information includes one or more of: the number of ports of the MRS, configuration information of a time/frequency domain resource of the MRS, and configuration information of a code domain resource;
configuration information of a system message;
configuration information of the message signal; and
configuration information of the STBs.

In the embodiment of the present disclosure, the processing unit 93 is configured to obtain position or period information of a second type MSG in a first type MSG after the processing unit receives the first type MSG.

In the embodiment of the present disclosure, the terminal determines a mapping relationship between a received random access response message and a received downlink synchronization signal port, message signal port or MRS port number.

It should be understood by those skilled in the art that implementation of functions of various units of the signal transmission device in FIG. 9 may be understood with reference to the related description of the foregoing signal transmission method.

In practical applications, the functions implemented by various units in the signal transmission device may all be implemented by a CPU, or an MPU, or a DSP, or an FPGA or the like located in the signal transmission device.

The signal transmission method provided by the embodiments of the present disclosure will be further described below in detail in conjunction with specific application scenarios.

Embodiment 1: Structures for Sending and Receiving a Signal and an Internal Multiplexing Mode For normal operation of a wireless system and a terminal device, the downlink access signal and the uplink access signal need to be provided respectively. The access signal is an essential signal for the wireless system. In the practical operation of the communication system and the terminal, the access signal needs to be continuously swept and transmitted. In addition to the access signal, other signals, such as reference signals used to measure, maintain, and track synchronization and channel conditions, also need to be swept and transmitted, so a time segment likewise carrying the sweep signal and other signals required to be swept in an access process may be referred as a sweep time interval (STI), and is classified into a DL TX sweep time interval and an UL RX sweep time interval from the perspective of a base station. Correspondingly, the time segment is classified into a DL RX sweep time interval and an UL TX sweep time interval from the perspective of a terminal. A subframe or a time interval for sending a sweep signal is generally used for sending a downlink access signal or an uplink access signal, and thus the subframe or the time interval for sending the sweep signal may also be referred as a subframe or a time interval for sending an access signal. The access signal herein include, but is not limited to, a synchronization signal, a signal in a broadcast channel, a random access signal, a scheduling request signal, and the like. In a real system definition, the time segment is not necessarily named as the STI, but belongs to the category of the STI as long as the time interval is related to the sweep and the access. The DL TX sweep time interval and the DL RX sweep time interval, although are not likely to be coincided in absolute time, are both correlated with a certain segment of a sweep signal transmitted by the base station. Similarly, the UL TX sweep time interval and the UL RX sweep time interval are also correlated. Here, the base station and the terminal are defined in a broad sense. Any possible network device such as a base station, a cell, a micro base station, a pico base station, a relay, a cellular, a transmit-receive point (TRP), a transmit point (TP) or the like belongs to the category of the base station, and any possible user equipment belongs to the category of the terminal.

The sweep time interval may carry one or more sweep beams. Therefore, the sweep time interval is also referred as a beam sweep time interval (BSTI) when a beam is carried. For the sake of uniformity, when the beam is carried on the time interval, the STI described in the present disclosure is equivalent to the BSTI. The STI may be a single time interval, or may also be a part of a longer time period such as a subframe or a frame.

A beam sweep within a sweep time interval is a beam transmission in a broad sense. However, due to the limitation of the capability of the RF channel, multiple beams need to be transmitted in a manner of beam time-sharing sweep. In special cases, if a device does not have beam capability, the beam sweep degrades into a beamless signal transmission.

It should be noted that the downlink STI and the uplink STI perform different functions, so the two types of STIs are different. For the base station, the base station transmits a beam over the downlink STI, and receives a beam transmitted by the terminal over the uplink STI which is a blank time receive window. For the terminal, the terminal transmits a beam over the uplink STI, and receives a beam transmitted by the base station over the downlink STI which is a blank time receive window.

For a base station device, the distribution density of the uplink STI in the time/frequency domain may be greater than or equal to the distribution density of the downlink STI in the time/frequency domain. This is because the receive or transmit channel state may have a difference in reciprocity. When the reciprocity of the receive or transmit channel state of the terminal can be guaranteed, the assumption that the distribution density of the uplink STI of the base station in the time/frequency domain is equal to the distribution density of the downlink STI in the time/frequency domain is reasonable. This is because the terminal may use the receive beam as the transmit beam to transmit the uplink access signal when the reciprocity is satisfied and in response to receiving the downlink STI of the base station. That is, the base station merely needs the STI in one-to-one correspondence with the downlink STI to receive the uplink access. When the reciprocity is not satisfied, the terminal cannot use prior information of the receive beam, and can merely try repeatedly on multiple transmit beams. In this way, the base station needs an uplink STI having a higher density than the downlink STI to receive an appropriate uplink access signal. Here, the density of the downlink STI and the uplink STI may refer to the time domain density, the frequency domain density, or a density of a mixed time domain and frequency domain. The difference in the time domain density is preferred, and the STI transmission in the frequency domain is considered in the case of insufficient time resources.

A one-to-many relationship between the downlink STI and the uplink STI exists. Specifically, one downlink STI is followed by a plurality of uplink STIs, and then another downlink STI is followed by a plurality of uplink STIs. A circulation forms in this way. This is merely a possible form of performance, and the present disclosure is not limited thereto.

The STI is consisted of independent STBs in series. The STBs are time-divided. A plurality of STBs may be transmitted over continuous time or over discrete time. If each STB carries a single beam or a plurality of beams, the each STB is equivalent to a beam sweep time block (BSTB). Under normal circumstances, the number of beams carried by the STB is less than or equal to the number of beams carried by the STI. The number of STBs in an STI may not be fixed due to different implementation capabilities of devices. If the STB is a fixed length of time, an unfixed length of the STI may be resulted in, which is determined by the implementation of the actual base station. From the perspective of the terminal, the number of STBs in an STI is transparent to the terminal, so the number of times the beam is swept may be attributed to an implementation problem of the base station, for increasing the flexibility of the system. If only one STB exists in an STI, it implies that merely a single beam (omnidirectional or directional) exists. In addition, it is also a possible implementation mode to clearly identify the number of STBs in an STI.

When the downlink STI corresponds to the uplink STI, the STB in the downlink STI is in one-to-one correspondence with the STB in the uplink STI. The one-to-one correspondence refers to that the sending order, number, index, and the like of the STB in the downlink STI are in one-to-one correspondence with the receiving order, number, index, and the like of the STB in the uplink STI. The method is characterized in that the terminal sends an access signal on an uplink STB corresponding to a downlink STB that is synchronized through the one-to-one correspondence between the STBs, and the base station may implicitly know from the detected RX STB that a base station synchronized with the terminal sends a STB, saving the corresponding uplink signaling overhead.

The downlink STI and the uplink STI between the base station and the terminal mentioned above can also be similarly used in the end-to-end or point-to-point communication, namely, the commonly known D2D communication. In this scenario, an interworking STI exists between any two nodes of the D2D communication. For example, an STI from the first node to the second node is a downlink STI, and an STI from the second node to the first node is an uplink STI. The first node is similar to the base station. The second node is similar to the terminal.

The STB of the downlink STI is mainly consisted of three types of signals: an SS, an MSG, and an MRS, respectively.

The synchronization signal (SS) may be a single synchronization signal or a hierarchical synchronization signal, which is similar to the primary synchronization signal (PSS) or the secondary synchronization signal (SSS) of LTE. The terminal searches for the synchronization signal (SS) to obtain a coarse synchronization of the system. If the STB carries a beam, the SS may also be used to obtain coarse beam information.

The message here is a synchronous companion message to distinguish the message from other types of messages. Most of the content carried by the message is related to the synchronization signal or related to the access and tracking synchronization. The message and the synchronization signal are coupled and bound. The SS exists and then a synchronous companion message must exist. When the port of the synchronization signal is different from the port of the message signal, the synchronization signal cannot be used to demodulate the message. For example, the synchronization signal is sent by using a single antenna port (reducing the complexity of a blind detection), the message signal is sent by using a space frequency block code (SFBC) multi-antenna port, and the antenna ports used at this time are different, so the synchronization signal cannot be used to demodulate the message.

When the port of the MRS is different from the port of the synchronization signal, for example, when the MRS sends different content in different beam directions while the message signal sends the same content in different directions, the MRS cannot be used to demodulate the message signal either.

Combining the above two points, a demodulation measurement reference signal dedicated to the message signal needs to be used for the demodulation of the message signal. In other cases, for example, when the message signal and the synchronization signal (SS) or the MRS use the same port, the SS or the MRS may also be used to assist the demodulation of the message.

Figure 2A:
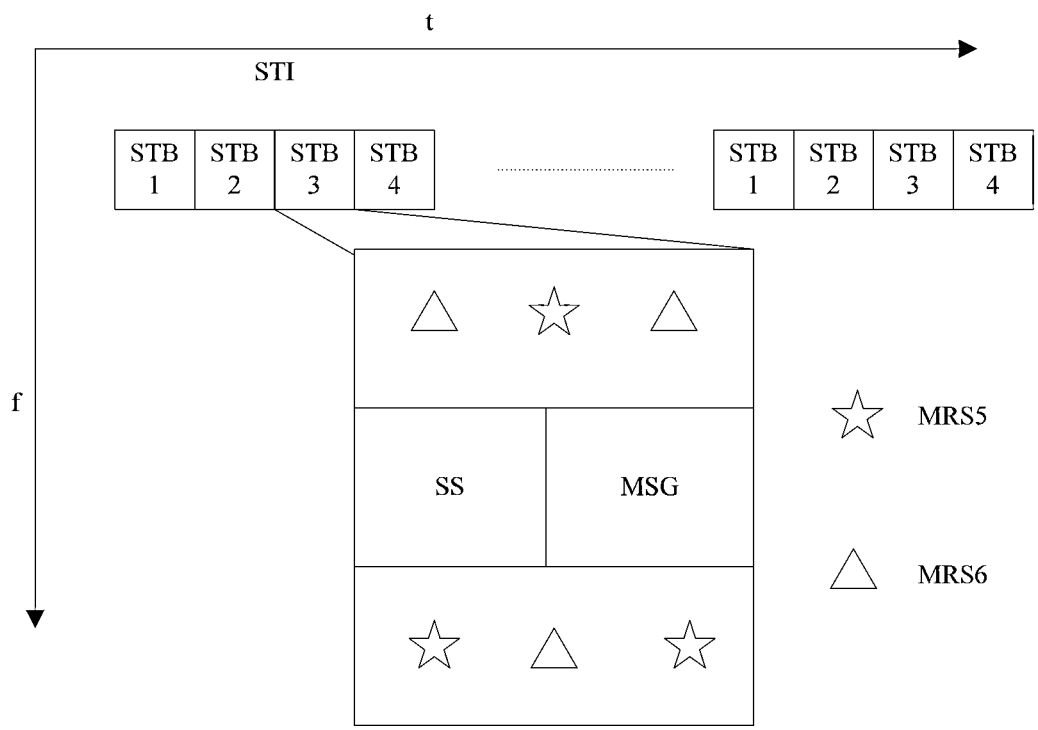
FIG. 2A is a schematic diagram 1 illustrating a time interval structure and multiplexing relationship of an STI according to an embodiment of the present disclosure.
Figure 2B:
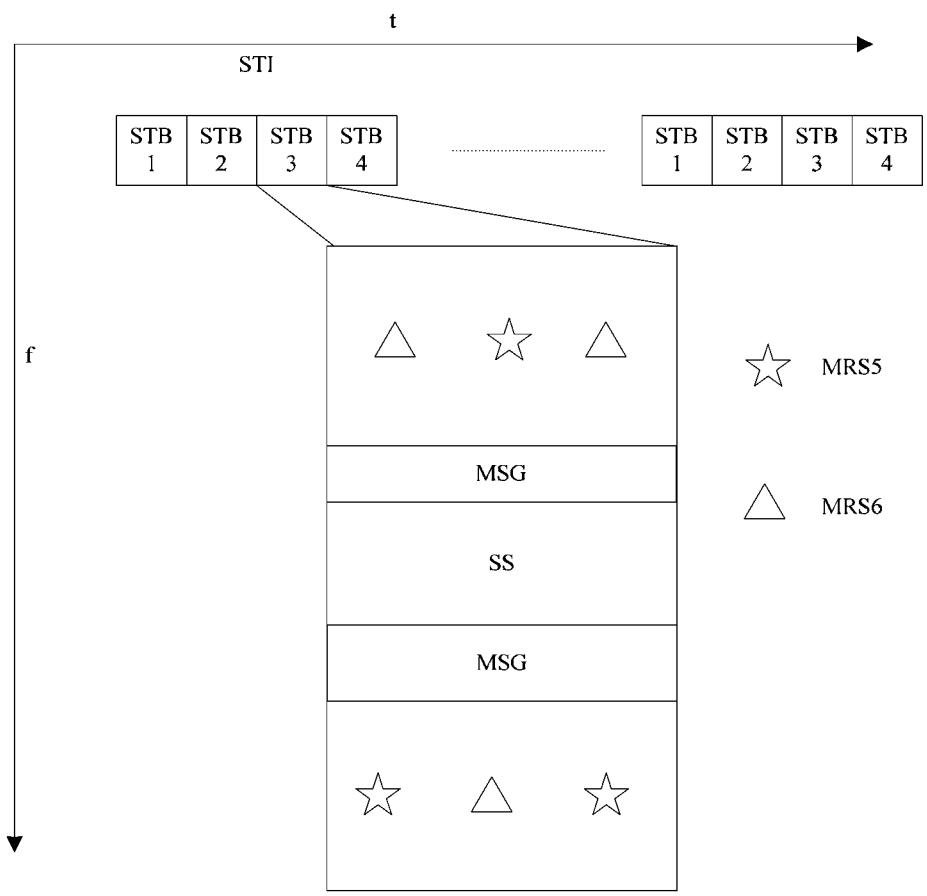
FIG. 2B is a schematic diagram 2 illustrating a time interval structure and multiplexing relationship of an STI according to the embodiment of the present disclosure.
Figure 2C:
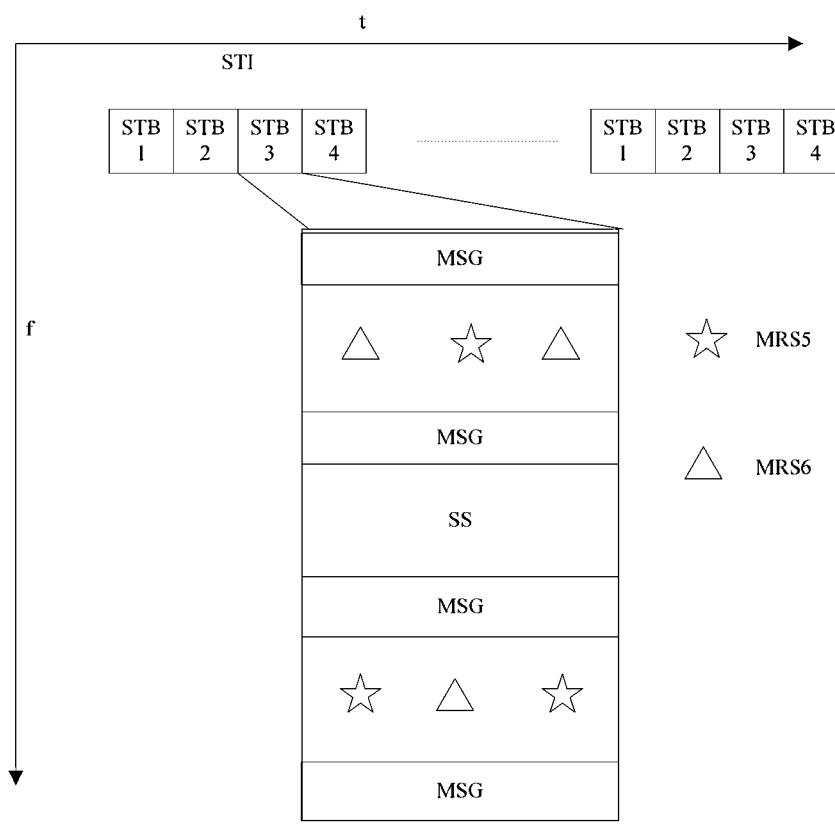
FIG. 2C is a schematic diagram 3 illustrating a time interval structure and multiplexing relationship of an STI according to the embodiment of the present disclosure.

The MRS mainly performs radio resource management (RRM) measurement, channel state information obtaining, and power control, and may also be used for fine synchronization, wireless link monitoring, and beam tracking. The RRM measurement result of the MRSs of a plurality of ports may calculate the RRM parameter of a cell. If the STB carries a beam, the MRS may also be used for obtaining coarse beam or fine beam information according to different types of the carried beams. In the implementation, the MRS is often expressed using a common definition "port", which is called the MRS port, but the port category in a common sense cannot fully cover the characteristics of the MRS. The port of the MRS may be an antenna port or a beam port, or a combined port of an antenna port and a beam port, and a plurality of beam ports may exist on one antenna port. The MRS is very flexible and the form thereof may be predefined or dynamically specified. The MRS may be a narrowband signal or a wideband signal, or may use a sparse pattern distribution, as shown in FIGS. 2A, 2B, and 2C. The MRS may implicitly carry the index information of the port or the beam. For example, the index information of the port or the beam is carried through the sequence of the MRS, the relative position of the time domain and the frequency domain of the MRS, and the like. The index and number information of the port or the beam may also be explicitly carried. For example, the index information is directly modulated on the time and frequency domain resources, and then sent.

The first type STB is in a full-signal mode, that is, the STB includes all three types of signals, and has complete functions.

The second type STB may only have the MRS. This may effectively reduce the density of the synchronization signal (SS) and the companion message MSG, and is more favorable for forward compatibility. When the STB only has the MRS, the STB may perform simple beam fine searches and beam maintenance and tracking.

The third type STB may only have the synchronization signal (SS) and the company message MSG. This type of STB can only be used for coarse searches and cannot be used for fine searches and signal training.

The fourth type STB may only have the synchronization signal (SS), and no other information and signals. This type of STB can only provide a primary timing relationship indication, cannot support the independent completion of an access process, and must rely on non-SS bound information or the MRS on other resources to complete the complete downlink synchronization process.

Due to different functional requirements, the four types of STBs may differ in structural design, for example, occupied time and frequency domain resources, such as the number of symbols, the length, and the frequency domain width. In particular, the number of symbols may be significantly different. The number of OFDM symbols occupied by the first type STB is greater than or equal to the number of OFDM symbols occupied by the second type STB. When beam tracking requires a higher density of the MRS, not all STIs are required to have the SS and the MSG. Thus, in the case where merely the second type STB exists, time domain resources may be effectively saved. When the SS and the MSG are time division multiplexed, the number of symbols of the first type is larger than the number of symbols of the second type. When the SS, the MSG, and the MRS are frequency division multiplexed, the numbers of STB symbols of the two types are the same. The third type STB has no MRS, so frequency domain resources may be saved. The fourth type STB needs to combine other signals or information to fulfill a complete synchronization process.

According to the composition of the STB in a same STI, the STI may be divided into five categories. The first category merely includes the first type STB, the second category of STI merely includes the second type STB, the third category of STI merely includes the third type STB, the fourth category of STI merely includes the fourth type STB, and the STI having mixed four types of STBs is the fifth category of mixed STI. By classifying STIs separately, the processing complexity of a terminal may be effectively reduced and resources may be saved.

The synchronization signal (SS), the synchronization companion message MSG, and the measurement reference signal are multiplexed in such a manner as described below.

The synchronization signal (SS) and the message MSG are multiplexed in a time division multiplexing (TDM) manner, and the synchronization signal is in front, as shown in FIG. 2A.

Another option is that the synchronization signal (SS) and the message MSG are multiplexed in a frequency division multiplexing (FDM) manner, and the message MSG may be distributed on two sides of the synchronization signal, as shown in FIG. 2B.

No matter how the synchronization signal and the MSG are multiplexed, the MRS and the other two types of signals are performed in a frequency division multiplexing (FDM) manner, and the MRS may be distributed outside the synchronization signal and the MSG, as shown in FIGS. 2A and 2B.

The distribution of the MRS is also not limited to the distribution shown in FIGS. 2a and 2b. The MRS may be inserted between the synchronization signal and the MSG in a frequency division multiplexing manner or inserted between MSG blocks. In the case where the MRS may be inserted between the MSG blocks, the MSG blocks are illustrated as being frequency discretely distributed, as shown in FIG. 2C.

The measurement reference signal and the synchronization/message signal within one STB are located in the same OFDM symbol, significantly different from the common reference signal (CRS) or channel state information reference signal (CSI-RS) of LTE. The CRS or the CSI-RS may be distributed on a symbol where the non-synchronization/message signal is located. The advantage is that the number of resources used for beam searches is reduced. In combination with the FDM multiplexing method, the lengths of the STB and the STI can be effectively reduced, the time required for completing coarse searches and fine searches can be compressed as much as possible, and the access delay can be reduced as much as possible.

When the SS and the MSG are vacant in the STB, resource multiplexing of the MRS is not affected.

Beams corresponding to the synchronization signal (SS) and the MSG are coarse beams, and the MRSs may correspond to coarse beams or fine beams. A coarse beam refers to that the entire space can be covered with fewer beams, while the coarse beam has a larger loss of beam gain than a fine beam. The fine beam has a clear orientation, an angle of incidence and an angle of emergence between the beams are extremely narrow, the granularity of variation is small, and a loss of the beam gain is extremely small. If the fine beam is required to cover the entire space, the number of fine beams required is large.

Figure 3:
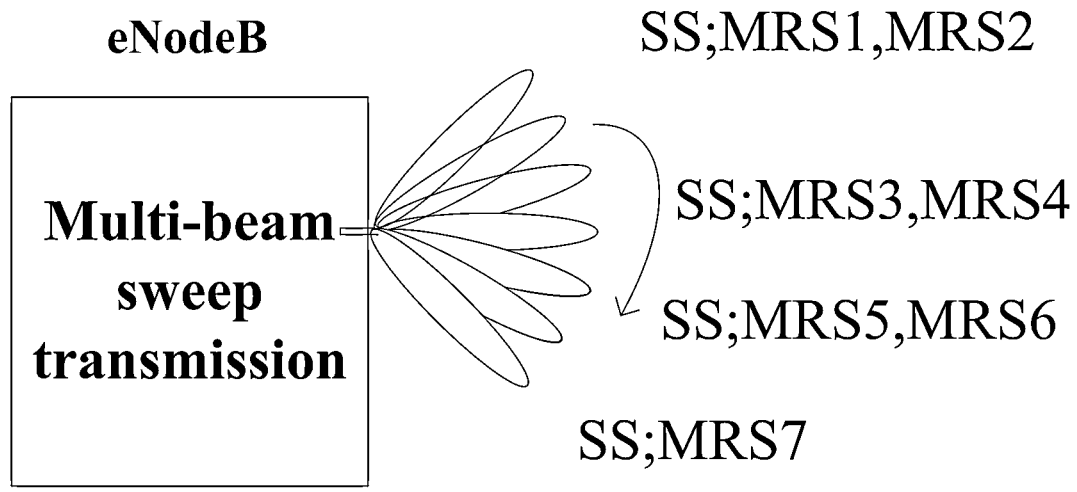
FIG. 3 is a schematic diagram of a relationship between a synchronization signal and an MRS beam according to an embodiment of the present disclosure.

The MRS and the synchronization signal and/or the message signal may use different ports, and the synchronization signal (SS) or the MSG uses a port as identification of a corresponding coarse beam. The MRS also uses a port as identification of a coarse beam or a fine beam. Different MRS ports use different time/frequency domain resources and/or code resources. The MRS and the synchronization signal and/or the message signal may also use the same port, such that either the port is used to identify the coarse beam, or the synchronization signal identifies the coarse beam while the message signal and the MRS identify the fine beam. If the MRS uses the port of the fine beam, and the synchronization signal and/or the message signal uses the port of the coarse beam, a plurality of MRS ports (or fine beams) can form the port (or coarse beam) of the SS or the MSG. From the perspective of coverage space, the coarse beam may be a combination of a plurality of fine beams. As shown in FIG. 2A, the coarse beam carrying the SS or the MSG on the STB3 is a combination of two fine beams carrying an MRS5 and an MRS6. If synchronization signals carried by coarse beams or synchronization signals belonging to different ports are attributed to the same cell, the sequences or indexes of the synchronization signals are completely consistent. It should be specially noted that although the SSs in a STB1, a STB2, . . . , a STBn all belong to the same cell and the sequence numbers or indexes of the synchronization signals (SS) are completely consistent, the ports of the SSs or the coarse beams used for spatially carrying the SSs are different. For example, a coarse beam carrying an SS or an MSG in the STB1 is a combination of two fine beams carrying an MRS1 and an MRS2, and a coarse beam carrying an SS or an MSG in a STB3 is a combination of two fine beams carrying the MRS5 and the MRS6. Therefore, strictly speaking, the synchronization signals in the STB1, the STB2, . . . , the STBn, from the perspective of the terminal, have the same sequence number or index, while the other parts are different. As shown in FIG. 3, seven fine beams and 4 groups of synchronization signal coarse beams all have the same synchronization signal sequence or index, while the MRSs are different, the fine beams are different, and the actual orientations of each group of coarse beams are caused to be different. The reason for using the same synchronization signal sequence or index on the same time/frequency resource is to reduce the selection of the ID of the synchronization signal, avoid great complexity due to excessive blind detection of the initial synchronization, reduce the complexity of the synchronization search, and also avoid more interference brought by an overlapping part among the fine beams. The search for the fine beam may be left to the MRS to complete. In special cases, for example, a plurality of transmit points (TP) exist in a cell, it is possible to configure different synchronization signals for different transmit-receive points (TRP). In addition, MRSs with different polarization directions, and fine beams with the same polarization direction but different orientations use different MRS ports.

Embodiment 2: Content of a Message Block Content and Mode of Sending

Much content in the MSG is transmitted by the base station, and at least one of the following information may be selected.

1. Time and frequency domain position information of a downlink STI, such as an absolute or relative position, periods, and the like of the time and frequency domains of the downlink STI, may be selected, and multiple types of downlink STIs may have multiple sets of time and frequency domain position information. The relative position is generally time difference and frequency difference calculated based on a radio frame boundary. For forward compatibility considerations, the position of the STI is not necessarily periodically sent from a fixed certain subframe or time interval. Therefore, the position of the STI needs to be notified in plain text, so that the terminal can obtain synchronization information at a level similar to the radio frame. For the forward compatibility considerations, fixed transmit positions need to be reduced as much as possible, thereby spacing more flexible positions to satisfy subsequent functions. The time and frequency domain position information of the downlink STI may be used as an index or number of the STI.

2. Time and frequency domain position information of a downlink STB, such as an absolute or relative position of the time and frequency domains of the downlink STB may be selected. The relative positions are generally time difference and frequency difference calculated based on an STI boundary. Because the number of STBs in an STI is large, the position notification message of the STB may allow the terminal to obtain synchronous timing information similar to a symbol level. This is also designed from the forward compatibility considerations. The time and frequency domain position information of the downlink STB may be used as an index or number of the STB.

3. Time and frequency domain position information of an uplink STI, such as an absolute or relative position, periods, and the like of the time and frequency domains of the uplink STI may be selected. The terminal is notified explicitly of the position and period for sending an uplink access signal. The uplink STI and the downlink STI may also be implicitly mapped, such as timing implied, which is also a solution, but not as flexible and robust as an explicit notification. Implicit mapping does not necessarily require signaling support, and may adopt a predefined rule. The period of the uplink STI may be shorter than the period of the downlink synchronization STI, that is, the case where the density of the uplink STI is greater than the density of the downlink STI may occur. Further, the uplink STI and the downlink STI may have a many-to-one mapping relationship, mainly because if the terminal has the multi-beam capability, the terminal needs to send the uplink access signal in time windows related to a plurality of uplink STIs in the case where the channel reciprocity of the terminal side is not satisfied. That is, the density of an uplink receive time interval will be greater than or equal to the density of a downlink transmit time interval containing the synchronization signal.

4. The information of the STB that sends the uplink access signal may be selected. This information solves the problem of how the terminal selects the STB in the uplink STI corresponding to the STB in the downlink STI to transmit the access signal. The STB in the uplink STI is used by a base station to receive the access signal sent by the terminal. Generally, if the reciprocity of the base station can be guaranteed, the sequence number of the STB in the uplink STI is the sequence number of the corresponding STB in the downlink STI. If the reciprocity of the base station is not guaranteed, the terminal needs to be informed through explicit signaling of STBs in the uplink STI that are selected. Therefore, this information may include whether the base station has reciprocity, or informing the terminal of specific STBs in the uplink STI used for sending the uplink access signal, or informing the terminal of the number of STBs carrying the uplink access signal that need to be sent in one STI, such as N (This implies that the terminal may continuously send uplink accesses of N STBs from a certain STB, as the starting point, in the STI), or obtaining which STBs send an uplink random access signal from a mapping relationship between the STB in the downlink STI and the STB in the uplink STI. The STB sending the uplink access signal may be all STBs or part of the all STBs in the STI. Information indicated by different downlink STIs may be different. After the terminal obtains the indication of uplink STBs for sending the access signal, the terminal sends the random access signal on the corresponding STB, and then the base station receives the uplink access signal on the time windows related to the uplink STBs.

5. Configuration information of the downlink STI carrying various types of STBs may be selected. A downlink STI including the first type STB, and a downlink STI including the second type STB are mentioned in the embodiment 1. The density of the former may be smaller than the density of the latter. Therefore, the time and frequency domain position information of different types of downlink STIs may also be separately notified. The configuration information includes the time and frequency domain position information of the downlink STIs including different types of STBs. Or the densities of the downlink STIs including different types of STBs are notified in other possible manners. Because the second type STB occupies fewer resources, system resources can be saved as a whole if the base station notifies this configuration information.

6. Uplink access configuration information, specifically an uplink access configuration set index may be selected. For the notification of the uplink STI time and frequency domain location information, a two-level notification may be considered. That is, only the access configuration set index is notified in the MSG, and specific information pointed to by the index is obtained from the system access configuration set. The system configuration set is a system message without a companion synchronization signal. The adoption of the two-level method requires waiting for the terminal to establish initial downlink synchronization, and then trying an uplink access after more configuration broadcast messages are obtained from other system message positions. The uplink access configuration set or the uplink access configuration information may include the following information required for the uplink access, such as time, frequency and code domain resources or resource pools used by the uplink access signal, and time and frequency domain resources for the terminal to receive the random access response information, a mapping relationship between the above two resources and MRS ports, and the like.

The terminal directly obtains the time, frequency and code domain resources according to the uplink access configuration set or the uplink access configuration information. In addition, the terminal may further determines the time, frequency, and code domain resources used by the uplink access signal according to a mapping relationship between the time, frequency, and code domain resource pools used by the uplink access signal or the predicted resources and the MRS ports.

The mapping relationship between the predicted resources and the MRS ports may be predefined by the system, or may be configured through an uplink access configuration set or uplink access configuration information.

7. Configuration information of the MRS, such as configuration information resource information of the time, frequency and code domain resources, the port number, the number of ports, the MRS pattern information, or the like, may be selected. The configuration information resource of the time, frequency or code domain resources is associated with the port, index or number of the MRS. When the terminal receives the configuration information, the configuration information is used for comparing and identifying the MRS send port or the fine beam, and is indicated in the uplink access signal of the terminal. In this way, the RAR may be sent based on the fine beam, and the receive performance is improved.

8. Configuration information of other system messages may be selected. If the system further has other system messages, the MSG may be used to notify whether related messages exist on this port, and the resource information such as the time and frequency positions and periods of the related system messages.

9. Time and frequency resource positions or periods of other types of or extended MSG information may be selected. For example, when the MSG adopts layered transmission, the position information or period of the MSG2 is sent in the MSG1. Or the current MSG information is a basic type of information, merely includes a small amount of necessary information, and informs the positions or periods of the other types of or extended MSG information.

10. Configuration information of the STB in the STI, such as the type, number, internal structure, and the like of the STB, may be selected. The internal structure may include related configuration information such as the number of symbols included in the STB, or the number of STBs that may be cascaded into a group.

11. The number of concurrent radio frequency channels of the base station, and the notification of the terminal about the radio frequency channel implementation capability of the base station may be selected.

12. The flag of the MRS overflow may be selected. This flag is used for identifying that the radio frequency channel on an STB cannot carry all the ports that need to be sent, which is called overflow.

When the MSG are not transmitted in layers, the MSG is selected among the options described above to determine a complete sending set, and the MSG having a complete message is sent after all SSs.

However, not all of the complete information in the set needs to be sent in the same frequency as the SS, so the MSG may also be considered to be sent in layers, for meeting different overhead requirements. The MSG may be divided into two hierarchies (an MSG1 and an MSG2). The MSG1 only includes part of the information in the above set, such as the position or period information of the STI and the STB in the set. If the MSG2 needs to be flexibly configured, the position information or period of the MSG2 may further be additionally indicated. The MSG2 has more information content than the MSG1, and may include up to the complete information in the set. Because the MSG2 has a large overhead, the MSG2 has a longer sending period than the MSG1, and appears to be more sparse. That is, the MSG2 is carried only after a small number of SSs, and the MSG1 is sent when no MSG2 exists behind the SS. When the MSG2 exists behind a certain SS, no MSG1 exists.

Embodiment 3: Signal Multiplexing Structure in an STB in Case of Insufficient MRS Resources In a case where the number of radio frequency channels of a device is large, the number of beams that can be swept at the same time is also large. If resources allocated to an MRS cannot be expanded in a time dimension, a case where the MRS resources in an STB are insufficient may occur.

In the first solution, the unplaceable MRS is placed on other resources decoupled with the SS, and these decoupled resources may be notified in the MSG or specified in other signaling.

Figure 4:
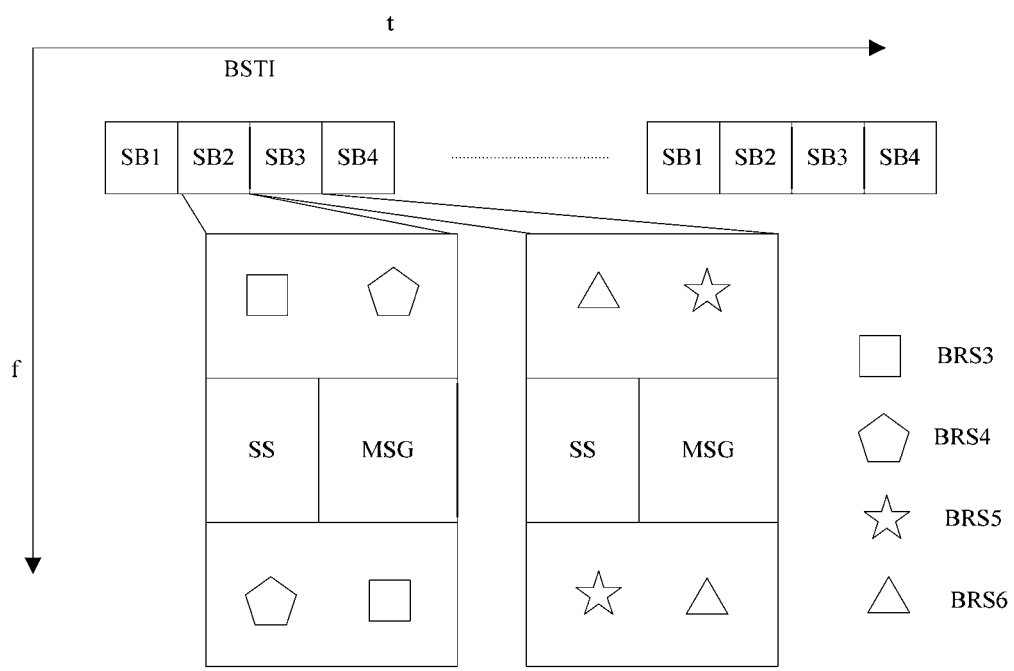
FIG. 4 is a schematic diagram 1 illustrating a solution to a problem of insufficient MRS resources according to an embodiment of the present disclosure.

In the second solution, time resources are expanded, the same SS is repeated, and more MRSs are sent on the extended time resources. As shown in FIG. 4, SSs in an STB2 and an STB3 are identical in sequence, index or coarse beam for carrying. The coarse beams for carrying are consisted of fine beams of an MRS3, an MRS4, an MRS5, and an MRS6, and the MRS3, the MRS4, the MRS5, and the MRS6 are sent in two STBs. This time extension basically belongs to the base station implementation problem. This solution may be abstracted as that the coarse beam carrying the SS is consisted of a plurality of fine beams carrying the MRSs, while the plurality of fine beams are not only from the fine beams carrying the MRSs in a same STB. The difference from the embodiment 1 is that, the coarse beam carrying the SS in a certain STB is consisted of a plurality of fine beams carrying MRSs in the same STB as shown in FIGS. 2A and 2B of the embodiment 1, while is from a plurality of fine beams carrying MRSs in a plurality of STBs in this embodiment.

The third solution is a variant of the second solution. A synchronization signal does not necessarily exist in each STB. For example, the SSs in the STB2 and the STB3 need not to be repeatedly sent, and only the SS in the STB2 needs to be reserved. As shown in FIG. 5:

In FIGS. 2A and 2B of the embodiment 1, the measurement reference signal ports from within one STB are combined to form a synchronization signal and/or message signal port. The second solution or the third solution in the embodiment 3 may be summarized as that the measurement reference signal ports from within a plurality of STBs are combined to form a synchronization signal and/or message signal port.

The premise of the second solution or the third solution is that at least one message is needed to inform the UE that too many MRSs exist now to be placed in one STB. The number of concurrent radio frequency channels may be notified in the MSG or the flag of an MRS overflow is set to True. When the number of concurrent radio frequency channels exceeds the maximum number of ports allowed by the MRS, it indicates that the MRS cannot be accommodated in one STB at a time. This notification is optional. If the number of concurrent radio frequency channels in the implementation capability of the base station is not greater than the maximum number of MRS ports, no notification is required, or the flag is set to false.

Embodiment 4: Behavior and Process Initiated by a Terminal

The terminal sends an access signal within an uplink STI.

If the terminal has a multi-beam capability, the terminal needs to send the access signal in time windows related to a plurality of uplink STIs in the case where the channel reciprocity of the terminal side is not satisfied. That is, the number of uplink receive time intervals is greater than or equal to the number of downlink transmit time intervals containing a synchronization signal. Then the terminal performs transmit port switching. When access time is limited, the terminal does not need to wait for a random access response from a base station or wait for an end of a timing window, and may directly change the port for sending.

After the base station receives the uplink access signal of the terminal, the base station may insert one or more items of indication information of the uplink STIs, such as the index numbers of the uplink STIs, into a random access request RAR message fed back to the terminal according to the uplink STIs over which effective access signals are received, so that the terminal can narrow the scope, and determine an appropriate transmit port for the terminal itself more easily. If the terminal switches the transmit port of the uplink access signal among a plurality of STBs within one STI, the base station needs to notify the terminal of the index or number of the uplink STB in addition to the index number of the uplink STI. This signaling notification can help the terminal determine the most appropriate transmit port in a manner of receiving signaling in case where the channel reciprocity of the terminal side cannot be satisfied.

If the channel reciprocity of the terminal is satisfied, the terminal merely needs to transmit the access signal in a relevant time period of an STB in a time window related to an uplink STI. Further, if the terminal knows that the base station satisfies the channel reciprocity conditions, the terminal does not need to send the access signal in time periods of all relevant STBs in this STI, and only needs to select the relevant time period of the receive STB mapped by the detected optimal transmit STB of the base station.

No matter whether the channel reciprocity is satisfied, the terminal may also send the access signal in a time period corresponding to a specific uplink STB according to the indication of the base station. For example, the eighth message in the MSG information in the embodiment 2 is used to notify the terminal.

When the terminal selects an MRS for searching and training in the synchronized STB, the terminal obtains the received quality of MRSs of different ports, determines the optimal receive MRS port, and then insert the optimal MRS port number into the uplink access signal, or transmits the random access signal in a manner of implicit mapping with the MRS resource. The base station receives the uplink access signal of the terminal over the uplink STI, and then may directly or indirectly obtain the information of the appropriate downlink MRS, such as the port number. The MRS port number has a mapping relationship with an uplink access response message RAR. The base station sends the uplink access response message by using the appropriate MRS port number, and the terminal receives an uplink access response signal at a corresponding position.

Embodiment 5: Sending an Uplink Access Signal by a Terminal

Figure 10:
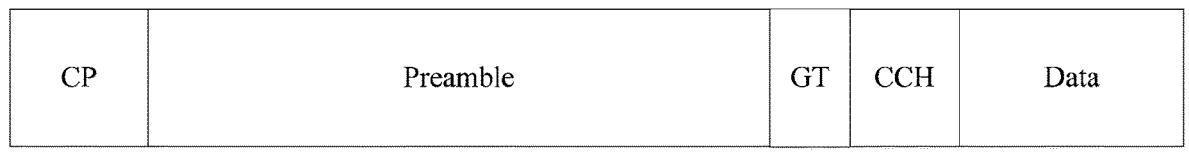
FIG. 10 is a structural diagram of an uplink access signal according to an embodiment of the present disclosure.

The terminal sends the uplink access signal, and the uplink access signal is sent in an uplink STB. A structural diagram of the uplink access signal is as shown in FIG. 10. The structure includes: a cyclic prefix (CP), a preamble, guard time (GT), a random access message, and the like. The random access information may also be comprised of a control channel (CCH) and access data.

The uplink STB may be a length of one or more OFDM symbols, or may be a time unit that is not an integral multiple of the length of the symbol. Here, the length of the uplink STB is flexible. Since a plurality of uplink STBs form an uplink STI, a total length of the STBs does not exceed the STI. The STBs that form the STI may be continuous or a discrete combination.

Figure 11:
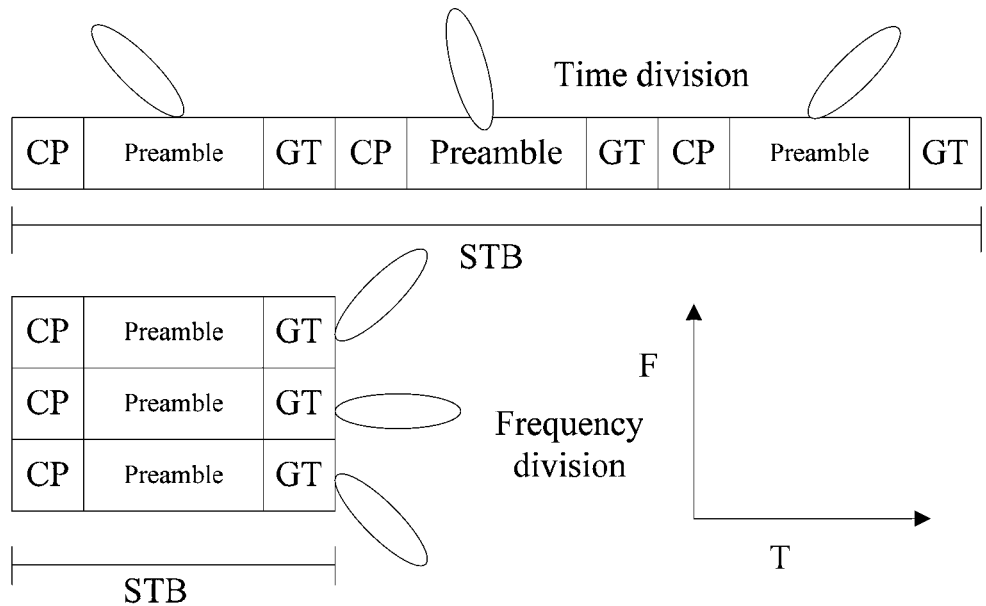
FIG. 11 is a schematic diagram in which uplink access signals are multiplexed in an STB in a frequency division manner according to an embodiment of the present disclosure.
Figure 12:
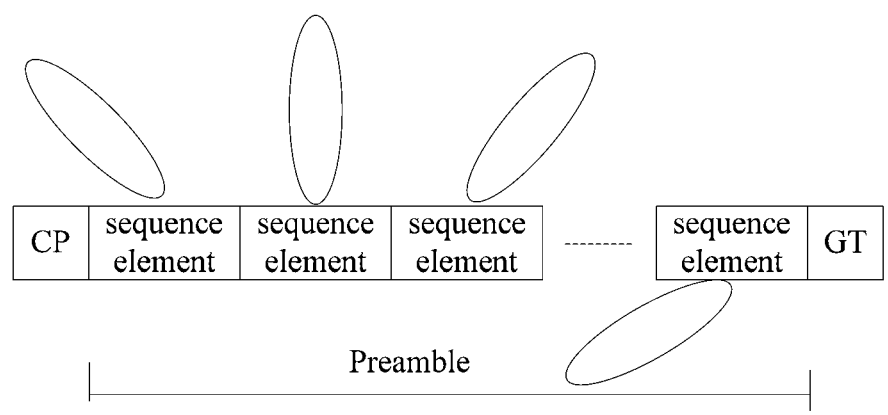
FIG. 12 is a schematic diagram in which an uplink access signal is multiplexed in an STB in a time division manner according to an embodiment of the present disclosure.

The plurality of uplink access signals are multiplexed in the STB in a time division manner or in a frequency division manner. An uplink access signal including merely the CP, the preamble, and the GT is taken as an example below to describe the two different multiplexing manners. A schematic diagram in which uplink access signals are multiplexed in an STB in the frequency division manner is shown in FIG. 11; and a schematic diagram in which an uplink access signal is multiplexed in an STB in the time division manner is shown in FIG. 12.

The plurality of uplink access signals in the STB may belong to a same terminal user or different terminal users. Sequences selected as the preambles of the plurality of uplink access signals may be the same or may be different. The terminal may simultaneously or continuously send the uplink random access signal without waiting for a random access response (RAR) of a certain uplink access signal. When merely one uplink access signal exists in an STB, this is a special case of degradation.

The RAR received by the terminal at least indicates which uplink random access signal the RAR is for, and indicates which preamble sequence and which sequence element the RAR corresponds to. The plurality of uplink access signals may choose to be transmitted in different beam directions or in the same beam direction.

The time and frequency domain resources selected by the uplink access signal in the STB may be determined by the time, frequency, code domain or antenna port information for receiving a downlink access signal, or a synchronization signal, or a system message or a measurement reference signal, or the like. For example, if a physical broadcast channel (PBCH) carrying downlink system information has 8 antenna ports, the terminal determines the best downlink antenna port through measurement, and searches for a corresponding position in the frequency domain to send the uplink access signal. The time for sending the uplink access signal is estimated through the time of the PBCH.

As described above, the plurality of STBs are consecutively or discretely connected into one STI. The plurality of STBs may be repeated sending of one STB, or may be consisted of STBs of different content or different send ports. The different content refers to the difference in components constituting the STBs, such as the difference in the sequence, sequence element or data information of the uplink access signal in the STBs. The send ports refer to that the STBs are sent in different beam directions.

The preamble sequence of the uplink access signal in the STB may be a complete sequence or a combination of a plurality of sequence elements. The plurality of sequence elements may be repetitions of a certain sequence element or may be different sequence elements. The sequence elements may also be short sequences, and the plurality of sequence elements may choose to be transmitted in different beam directions.

It should be understood by those skilled in the art that the embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

Accordingly, the present disclosure further provides a computer storage medium which stores computer programs configured to execute the signal transmission method according to the embodiments of the present disclosure.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or a processor of another programmable data processing device produce an device for implementing functions specified in one or more flows in the flowcharts and/or one or more blocks in the block diagrams.

These computer program instructions may also be stored in a computer-readable memory which can direct a computer or another programmable data processing device to operate in a particular manner so that the instructions stored in the computer-readable memory produce a manufactured product including an instructing device. The instructing device implements the functions specified in one or more flows in the flowcharts and/or one or more blocks in the block diagrams.

These computer program instructions may also be loaded onto a computer or another programmable data processing device so that a series of operations and steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

In the technical solution of the present disclosure, a base station sends or receives a signal within an access signal time interval which includes STBs. The access signal time interval includes a downlink access signal time interval and an uplink access signal time interval. The base station sends the signal over the downlink access signal time interval, and receives the signal over the uplink access signal time interval. Correspondingly, a terminal sends or receives a signal within an access signal time interval which includes STBs. The access signal time interval includes a downlink access signal time interval and an uplink access signal time interval. The terminal sends the signal over the downlink access signal time interval, and receives the signal over the uplink access signal time interval. In this way, a signal transmission method is specially designed for the sweeping of a training signal, which achieves sweep sending and receiving of the training signal during the initial access and the synchronous tracking, and reduces the delay of the signal training.

What is claimed is:

1. A method of wireless communication, comprising:
   transmitting, by a base station, multiple measurement reference signals and a synchronization signal to a user equipment,
   wherein the multiple measurement reference signals and the synchronization signal are within a downlink access time interval that comprises multiple sweeping time blocks,
   wherein the synchronization signal is carried in a coarse beam corresponding to multiple fine beams that carry the multiple measurement reference signals; and
   performing a transmission with the user equipment based on the multiple measurement reference signals and the synchronization signal.

2. The method of claim 1, wherein ports of the multiple measurement reference signals within the multiple sweeping time blocks correspond to a port of the synchronization signal.

3. The method of claim 1, wherein the synchronization signal is repeated within the multiple sweeping time blocks.

4. The method of claim 1, wherein a void signal as a placeholder for the synchronization signal is included in at least one of the multiple sweeping time blocks.

5. The method of claim 1, further comprising:
   transmitting, by the base station, an indication to the user equipment indicating that more than one sweeping time block are needed for carrying the measurement reference signals.

6. A method of wireless communication, comprising:
   receiving, by a user equipment, multiple measurement reference signals and a synchronization signal from a base station,
   wherein the multiple measurement reference signals and the synchronization signal are within a downlink access time interval that comprises multiple sweeping time blocks,
   wherein the synchronization signal is carried in a coarse beam corresponding to multiple fine beams that carry the multiple measurement reference signals; and
   performing a transmission with the base station based on the multiple measurement reference signals and the synchronization signal.

7. The method of claim 6, wherein ports of the multiple measurement reference signals within the multiple sweeping time blocks correspond to a port of the synchronization signal.

8. The method of claim 6, wherein the synchronization signal is repeated within the multiple sweeping time blocks.

9. The method of claim 6, wherein a void signal as a placeholder for the synchronization signal is included in at least one of the multiple sweeping time blocks.

10. The method of claim 6, further comprising:
    receiving, by the user equipment, an indication from the base station indicating that more than one sweeping time block are needed for carrying the measurement reference signals.

11. A wireless communication device, comprising one or more processors that are configured to:
    transmit multiple measurement reference signals and a synchronization signal to a user equipment,
    wherein the multiple measurement reference signals and the synchronization signal are within a downlink access time interval that comprises multiple sweeping time blocks,
    wherein the synchronization signal is carried in a coarse beam corresponding to multiple fine beams that carry the multiple measurement reference signals; and
    perform a transmission with the user equipment based on the multiple measurement reference signals and the synchronization signal.

12. The wireless communication device of claim 11, wherein ports of the multiple measurement reference signals within the multiple sweeping time blocks correspond to a port of the synchronization signal.

13. The wireless communication device of claim 11, wherein the synchronization signal is repeated within the multiple sweeping time blocks.

14. The wireless communication device of claim 11, wherein a void signal as a placeholder for the synchronization signal is included in at least one of the multiple sweeping time blocks.

15. The wireless communication device of claim 11, wherein the one or more processors are configured to:
    transmit an indication to the user equipment indicating that more than one sweeping time block are needed for carrying the measurement reference signals.

16. A wireless communication device, comprising one or more processors that are configured to:
    receive multiple measurement reference signals and a synchronization signal from a base station,
    wherein the multiple measurement reference signals and the synchronization signal are within a downlink access time interval that comprises multiple sweeping time blocks,
    wherein the synchronization signal is carried in a coarse beam corresponding to multiple fine beams that carry the multiple measurement reference signals; and
    perform a transmission with the base station based on the multiple measurement reference signals and the synchronization signal.

17. The wireless communication device of claim 16, wherein ports of the multiple measurement reference signals within the multiple sweeping time blocks correspond to a port of the synchronization signal.

18. The wireless communication device of claim 16, wherein the synchronization signal is repeated within the multiple sweeping time blocks.

19. The wireless communication device of claim 16, wherein a void signal as a placeholder for the synchronization signal is included in at least one of the multiple sweeping time blocks.

20. The wireless communication device of claim 16, wherein the one or more processors are configured to:
    receive an indication from the base station indicating that more than one sweeping time block are needed for carrying the measurement reference signals.

* * * * *